(12) United States Patent
Imai et al.

(10) Patent No.: US 11,055,563 B2
(45) Date of Patent: Jul. 6, 2021

(54) HEATING COOKER, COOKING SYSTEM, ARITHMETIC DEVICE, AND COOKING SUPPORT METHOD

(71) Applicant: Panasonic Intellectual Property Management Co., Ltd., Osaka (JP)

(72) Inventors: Hirohisa Imai, Shiga (JP); Hiroyoshi Nomura, Shiga (JP); Koichiro Yamashita, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 497 days.

(21) Appl. No.: 14/442,639

(22) PCT Filed: Oct. 22, 2014

(86) PCT No.: PCT/JP2014/005370
§ 371 (c)(1),
(2) Date: May 13, 2015

(87) PCT Pub. No.: WO2015/059931
PCT Pub. Date: Apr. 30, 2015

(65) Prior Publication Data
US 2016/0283822 A1    Sep. 29, 2016

(30) Foreign Application Priority Data

Oct. 24, 2013   (JP) .............................. JP2013-220793
Dec. 12, 2013   (JP) .............................. JP2013-256771

(51) Int. Cl.
*G06K 9/62*      (2006.01)
*H05B 6/64*      (2006.01)
(Continued)

(52) U.S. Cl.
CPC ............ *G06K 9/6212* (2013.01); *F24C 7/085* (2013.01); *G06K 9/6215* (2013.01);
(Continued)

(58) Field of Classification Search
CPC ......... F24C 7/085; H05B 6/68; H05B 6/6447; H05B 6/6435; H05B 6/6455;
(Continued)

(56) References Cited

U.S. PATENT DOCUMENTS 4,447,692 A * 5/1984 Mierzwinski ........ H05B 6/6435
                                                    219/720
4,471,195 A * 9/1984 Ishii ...................... A47J 37/047
                                                    219/518

(Continued)

FOREIGN PATENT DOCUMENTS

CN      102384499 A      3/2012
JP      2001-272045 A    10/2001
(Continued)

OTHER PUBLICATIONS

Machine Translation of JP 2005-140418 A, Sharp Corp, Jun. 2, 2005.*

(Continued)

*Primary Examiner* — Eric S Stapleton
(74) *Attorney, Agent, or Firm* — Brinks Gilson & Lione

(57) ABSTRACT

A heating cooker includes a heating chamber that houses food, a heating unit that heats the food, an imaging unit that acquires image data on the food after the food has been housed in the heating chamber, a setting unit that accepts a user input relating to heating control content defining a heating operation, a storage unit that stores control information in which the image data and the heating control content corresponding to the food specified from the image data are associated with each other, a heating start button (Continued)

that orders the start of the heating operation, and a storage update unit that associates the image data and the heating control content with each other and updates the control information within the storage unit, when the setting unit accepts the user input and then the heating start button orders the start of the heating operation.

10 Claims, 19 Drawing Sheets

(51) Int. Cl.
  *F24C 7/08* (2006.01)
  *H05B 6/68* (2006.01)
(52) U.S. Cl.
  CPC ......... *H05B 6/6402* (2013.01); *H05B 6/6435* (2013.01); *H05B 6/6447* (2013.01); *H05B 6/6455* (2013.01); *H05B 6/6473* (2013.01); *H05B 6/6479* (2013.01); *H05B 6/6485* (2013.01); *H05B 6/68* (2013.01); *A23V 2002/00* (2013.01); *G06K 2209/17* (2013.01)
(58) Field of Classification Search
  CPC .. H05B 6/6473; H05B 6/6479; H05B 6/6485; H05B 6/6402; G06K 9/6215; G06K 9/6212; G06K 2209/17; A23L 1/0255; A23L 1/0128; A23V 2002/00
  USPC .......................................................... 99/486
  See application file for complete search history.

(56) References Cited

U.S. PATENT DOCUMENTS

| | | | | | |
|---|---|---|---|---|---|
| 4,625,086 | A | * | 11/1986 | Karino | H05B 6/645 219/506 |
| 5,360,965 | A | * | 11/1994 | Ishii | H05B 6/64 219/685 |
| 5,478,987 | A | * | 12/1995 | Morita | H05B 6/6458 219/705 |
| 5,512,736 | A | * | 4/1996 | Kang | H05B 6/6464 219/704 |
| 5,548,101 | A | * | 8/1996 | Lee | H05B 6/129 219/601 |
| 5,591,261 | A | * | 1/1997 | Ciaramita | A21C 15/00 118/13 |
| 5,831,253 | A | * | 11/1998 | Han | H05B 6/6411 219/708 |
| 5,967,021 | A | * | 10/1999 | Yung | A21B 7/005 366/144 |
| 6,133,558 | A | * | 10/2000 | Ueda | H05B 6/645 219/682 |
| 6,196,113 | B1 | * | 3/2001 | Yung | A21B 7/005 366/144 |
| 6,508,762 | B2 | * | 1/2003 | Karnieli | G06F 19/324 128/921 |
| 6,658,994 | B1 | * | 12/2003 | McMillan | A23L 3/3418 219/214 |
| 6,713,740 | B2 | * | 3/2004 | Hwang | H05B 6/6408 126/337 R |
| 6,850,861 | B1 | * | 2/2005 | Faiola | G01K 1/026 374/E1.005 |
| 6,884,449 | B2 | * | 4/2005 | Lee | H05B 6/6458 219/678 |
| 6,930,294 | B2 | * | 8/2005 | Kim | H05B 6/6447 219/404 |
| 7,235,762 | B2 | * | 6/2007 | Gagas | F24C 7/087 219/385 |
| 7,245,221 | B2 | * | 7/2007 | Claudatos | G06Q 10/087 340/10.1 |
| 7,304,275 | B2 | * | 12/2007 | Chun | H05B 6/6441 219/497 |
| 7,375,294 | B2 | * | 5/2008 | Kraft | G01G 19/4144 177/25.15 |
| 7,488,919 | B2 | * | 2/2009 | Gagas | F24C 7/087 219/400 |
| 7,973,642 | B2 | * | 7/2011 | Schackmuth | G06Q 10/06 340/10.51 |
| 8,207,479 | B2 | * | 6/2012 | Ben-Shmuel | H05B 6/647 219/704 |
| 8,492,686 | B2 | * | 7/2013 | Bilchinsky | H05B 6/688 219/678 |
| 8,759,729 | B2 | * | 6/2014 | Ben-Shmuel | H05B 6/647 219/697 |
| 8,839,527 | B2 | * | 9/2014 | Ben-Shmuel | D06F 58/266 34/255 |
| 8,941,040 | B2 | * | 1/2015 | Ben-Shmuel | H05B 6/647 219/702 |
| 9,040,883 | B2 | * | 5/2015 | Ben-Shmuel | H05B 6/647 219/696 |
| 9,078,298 | B2 | * | 7/2015 | Ben-Shmuel | H05B 6/647 |
| 9,111,185 | B2 | * | 8/2015 | Lee | G06Q 10/10 |
| 9,131,543 | B2 | * | 9/2015 | Ben-Shmuel | H05B 6/72 |
| 9,167,633 | B2 | * | 10/2015 | Ben-Shmuel | H05B 6/6402 |
| 9,215,756 | B2 | * | 12/2015 | Bilchinsky | H05B 6/705 |
| 9,257,150 | B2 | * | 2/2016 | Hurst | G11B 27/34 |
| 9,332,877 | B2 | * | 5/2016 | Cochran | A47J 36/02 |
| 9,349,297 | B1 | * | 5/2016 | Ortiz | H04N 7/18 |
| 9,357,877 | B2 | * | 6/2016 | Cochran | A47J 36/02 |
| 9,436,683 | B2 | * | 9/2016 | Klos | G06Q 10/06 |
| 9,538,880 | B2 | * | 1/2017 | Riefenstein | F24C 7/085 |
| 9,639,823 | B2 | * | 5/2017 | Park | F25D 29/00 |
| 9,704,122 | B2 | * | 7/2017 | Jung | G06Q 10/06313 |
| 2004/0056761 | A1 | * | 3/2004 | Vaseloff | A47F 10/06 340/309.16 |
| 2004/0099735 | A1 | * | 5/2004 | Neumark | G06K 17/0022 235/385 |
| 2005/0193901 | A1 | * | 9/2005 | Buehler | A47J 44/00 99/468 |
| 2006/0218057 | A1 | * | 9/2006 | Fitzpatrick | G06Q 10/04 705/28 |
| 2007/0007279 | A1 | * | 1/2007 | Chun | H05B 6/6441 219/506 |
| 2012/0099255 | A1 | * | 4/2012 | Lee | F25D 25/025 361/679.01 |
| 2013/0186887 | A1 | * | 7/2013 | Hallgren | H05B 6/686 219/702 |

FOREIGN PATENT DOCUMENTS

| | | |
|---|---|---|
| JP | 2001-324146 A | 11/2001 |
| JP | 2005-140418 A | 6/2005 |
| JP | 2007-17142 A | 1/2007 |
| JP | 2012-108282 A | 6/2012 |
| JP | 2013-53794 A | 3/2013 |

OTHER PUBLICATIONS

International Search Report in corresponding International Application No. PCT/JP2014/005370, dated Jan. 20, 2015, 2 pages.

* cited by examiner

HEATING COOKER, COOKING SYSTEM, ARITHMETIC DEVICE, AND COOKING SUPPORT METHOD

This application is a 371 application of PCT/JP2014/005,370 having an international filing date of Oct. 22, 2014, which claims priority to JP 2013-220793 filed Oct. 24, 2013 and JP 2013-256771 filed Dec. 12, 2013, the entire contents of which are incorporated herein by reference.

TECHNICAL FIELD

The present invention relates to a heating cooker that heats food, a cooking system, an arithmetic device, and a cooking support method.

BACKGROUND ART

A convection microwave oven that is a typical heating cooker includes various heat sources such as an oven, grill, and steam in addition to a microwave heat source. By selecting and heating with an appropriate heat source out of the plurality of heat sources, a wide variety of cooking, re-heating, or the like is made possible. However, since a conventional heating cooker is made to deal with a wide variety of cooking or re-heating, a setting operation of control content for a heat source becomes complex.

Conventionally, in order to simplify a setting operation of control content for a heat source, there has been a heating cooker that images food that is a heating object with a camera to estimate what the food is through image recognition, estimates appropriate control content of a heat source with respect to the estimated food, and presents a user with an estimation result.

However, there is a wide variety of food or dishes used by a user, and it is not easy to estimate optimum heating control content from an image of a wide variety of food put in a wide variety of dishes. Moreover, there is a difference in preference for each user, and it is difficult to estimate heating control content in accordance with the preference of a user.

As a method of solving those tasks, there is a method in which a user registers individual cooking information in association with a dish image (for example, see Patent Literature 1). A dish is imaged with a camera provided to the front surface of a convection microwave oven, and a user registers individual cooking information such as, for example, the finishing temperature in association with a taken image. Thereafter, by the dish being held in front of the camera by a user and imaged at the time of cooking, the individual cooking information associated with the dish is presented.

While there are a wide variety of food or dishes in the world, dishes actually used by a user at home are limited, and the preference of the user is reflected with this method, if an image of a dish is registered in association with individual cooking information desired by the user. By the same dish as the dish already registered being imaged with a camera and the taken image being recognized, desired individual cooking information is presented to the user.

However, in the conventional example described above, a user needs to perform an operation for registering an image of food or dish, aside from an operation for heating food. Such an operation is an operation felt to be troublesome as extra work for the user. With the complex operation, convenience for the user may be compromised.

CITATION LIST

Patent Literature

Patent Literature 1: Japanese Unexamined Patent Publication No. 2005-140418.

SUMMARY OF INVENTION

The present invention has been made in order to solve the tasks described above, and an object is to provide a heating cooker, a cooking system, an arithmetic device, and a cooking support method that can improve the convenience for a user.

A heating cooker according to one aspect of the present invention includes: a heating chamber that houses food; a heating unit that heats the food in the heating chamber; an image data acquisition unit that acquires image data on the food after the food has been housed in the heating chamber; an acceptance unit that accepts a user input relating to heating control content defining a heating operation of the heating unit; a first storage unit that stores control information in which the image data and the heating control content corresponding to the food specified from the image data are associated with each other; a start order unit that orders start of the heating operation to the heating unit; and an update unit that associates the image data and the heating control content with each other and updates the control information within the first storage unit, when the acceptance unit accepts the user input and then the start order unit orders start of the heating operation.

With the present invention, the image data of the food and the heating control content can be stored automatically in the storage unit in association with each other, merely by the user input of the heating control content being accepted and the start of the heating operation being ordered. Therefore, work of registering the image data and the heating control content can be performed without particular intention by a user, and convenience for the user can be improved.

DETAILED DESCRIPTION OF THE PREFERRED EMBODIMENTS

Embodiments of the present invention will be described below with reference to the accompanying drawings. The embodiments below are specific examples of the present invention and do not limit a technical range of the present invention.

Embodiment 1

Figure 1:
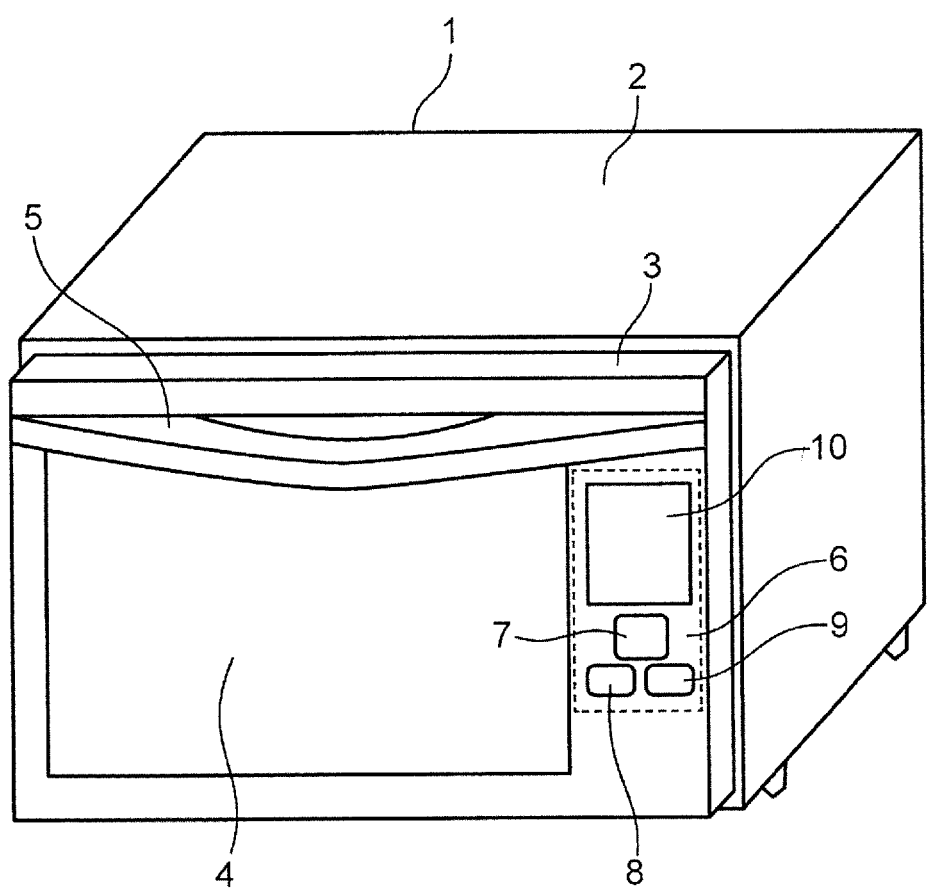
FIG. 1 is an external perspective diagram of a convection microwave oven according to Embodiment 1 of the present invention.

FIG. 1 is an external perspective diagram of a convection microwave oven according to Embodiment 1 of the present invention. A convection microwave oven 1 is a typical example of a heating cooker. As shown in FIG. 1, the convection microwave oven 1 includes a casing 2 for storing food, a door 3 provided to the front surface of the casing 2, a transparent glass window 4 provided to the door 3 for visibility inside the casing 2, a handle 5 for gripping when opening or closing the door 3, and an operation presentation unit 6.

The operation presentation unit 6 includes a heating start button (start order unit) 7, a cancel button (stop order unit) 8, a back button 9, and a liquid crystal touch panel 10. The start order unit is not limited to the heating start button 7, and the stop order unit is not limited to the cancel button 8.

The heating start button 7 is a button that is pressed when starting a heating operation, after heating control content has been set using the liquid crystal touch panel 10. The cancel button 8 is a button that is pressed in the case of stopping a heating operation during heating, after the heating start button 7 has been pressed to start the heating operation. The cancel button 8 is a button that is pressed in the case of cancelling an operation in the liquid crystal touch panel 10. The back button 9 is a button that is pressed when returning a display screen of the liquid crystal touch panel 10 to a previous display screen. The liquid crystal touch panel 10 is one example of a presentation unit and an acceptance unit. A touch panel is formed integrally on the front surface of a color liquid crystal panel. The presentation unit and the acceptance unit are not limited to the liquid crystal touch panel 10.

The liquid crystal touch panel 10 may include the heating start button 7, the cancel button 8, and the back button 9.

The convection microwave oven 1 is one example of a heating cooker. However, this disclosure can be applied to other heating cookers such as a rice cooker or an IH cooking heater.

Figure 2:
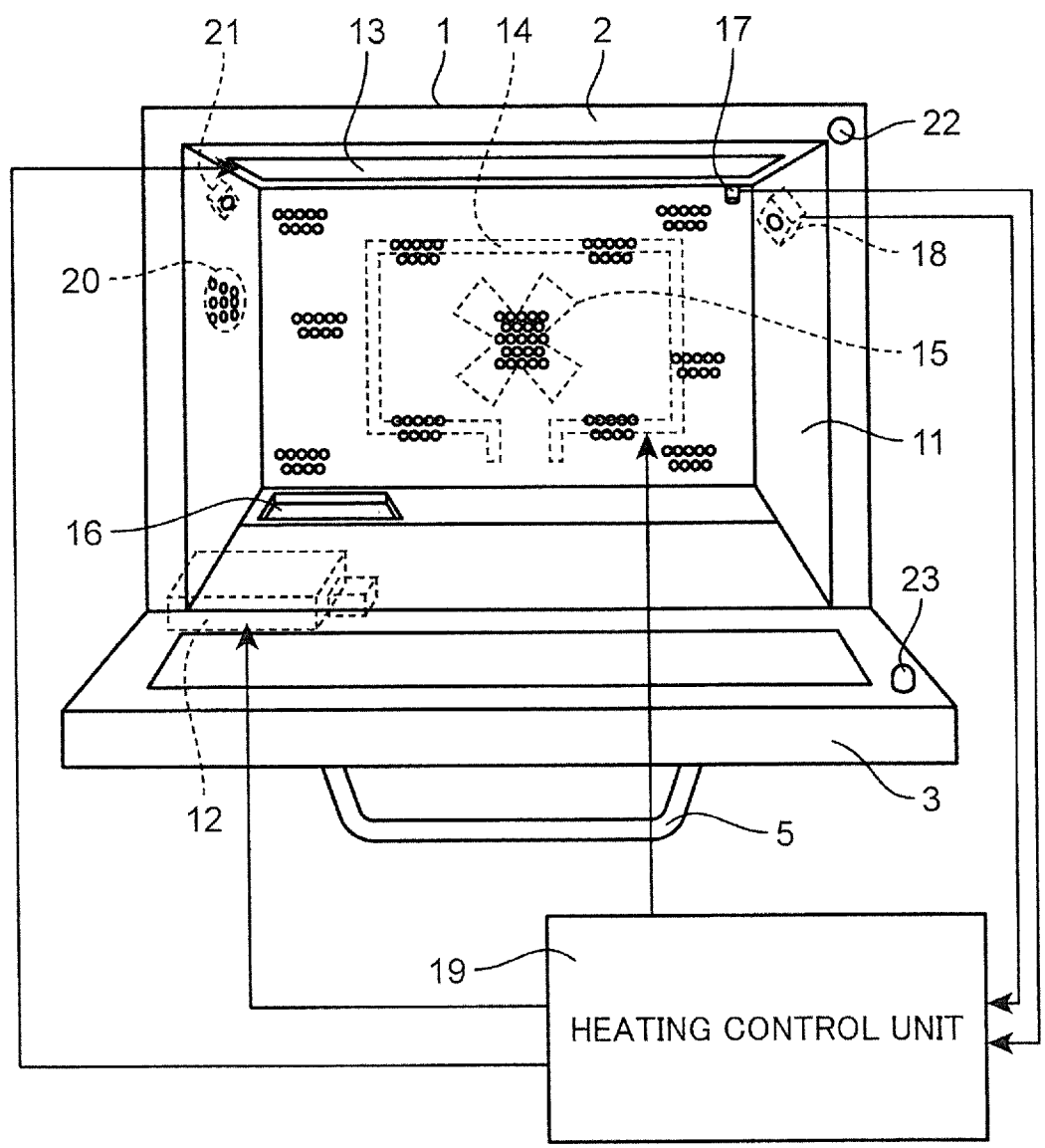
FIG. 2 is a schematic configuration diagram of the convection microwave oven according to Embodiment 1 of the present invention.

FIG. 2 is a schematic configuration diagram of the convection microwave oven 1 according to Embodiment 1 of the present invention. For cooking of food with heat, the convection microwave oven 1 is capable of heating with high-frequency waves, heat radiation, heated air, or steam. The convection microwave oven 1 includes a heating chamber 11 that houses food. The convection microwave oven 1 includes a magnetron 12 that outputs high-frequency waves within the heating chamber 11 housing food or the like, a flat heater 13 that generates radiation heat, a convection heater (sheathed heater) 14 for heating within the heating chamber 11, a circulation fan 15 for supplying heat of the convection heater 14 as hot air within the heating chamber 11, and a steam generator 16 for generating steam within the heating chamber 11. The convection microwave oven 1 supplies the heating chamber 11 with at least one of high-frequency waves, radiation heat, hot air, and steam to heat food.

The magnetron 12, the flat heater 13, the convection heater 14, or the steam generator 16 corresponds to one example of a heating unit that heats food in the heating chamber 11. The heating unit is not limited to the magnetron 12, the flat heater 13, the convection heater 14, or the steam generator 16.

The convection microwave oven 1 includes a thermistor 17, an infrared sensor 18, and a heating control unit 19. The thermistor 17 detects the atmospheric temperature inside the heating chamber 11. The infrared sensor 18 detects the surface temperature of food. The heating control unit 19 appropriately heats food by controlling each heating unit such as the magnetron 12, the flat heater 13, the convection heater 14, or the steam generator 16, based on information detected by the thermistor 17 and the infrared sensor 18. A temperature control technique in this embodiment is not limited to a specific temperature control technique.

The convection microwave oven 1 includes a light bulb (illumination unit) 20 provided to the side surface within the heating chamber 11 and an imaging unit (image data acquisition unit) 21 provided to the same side surface as for the light bulb 20. The imaging unit 21 is configured of, for example, a camera and takes an image of food within the heating chamber 11. The imaging unit 21 acquires image data of food after the food has been housed in the heating chamber 11. Since the imaging unit 21 is arranged at the same side surface as for the light bulb 20, the inside of the heating chamber 11 can be imaged without being backlit. The casing 2 includes a door switch 22 for detecting opening or closing of the door 3. The door 3 includes a protrusion unit 23 for pushing in the door switch 22.

Figure 3:
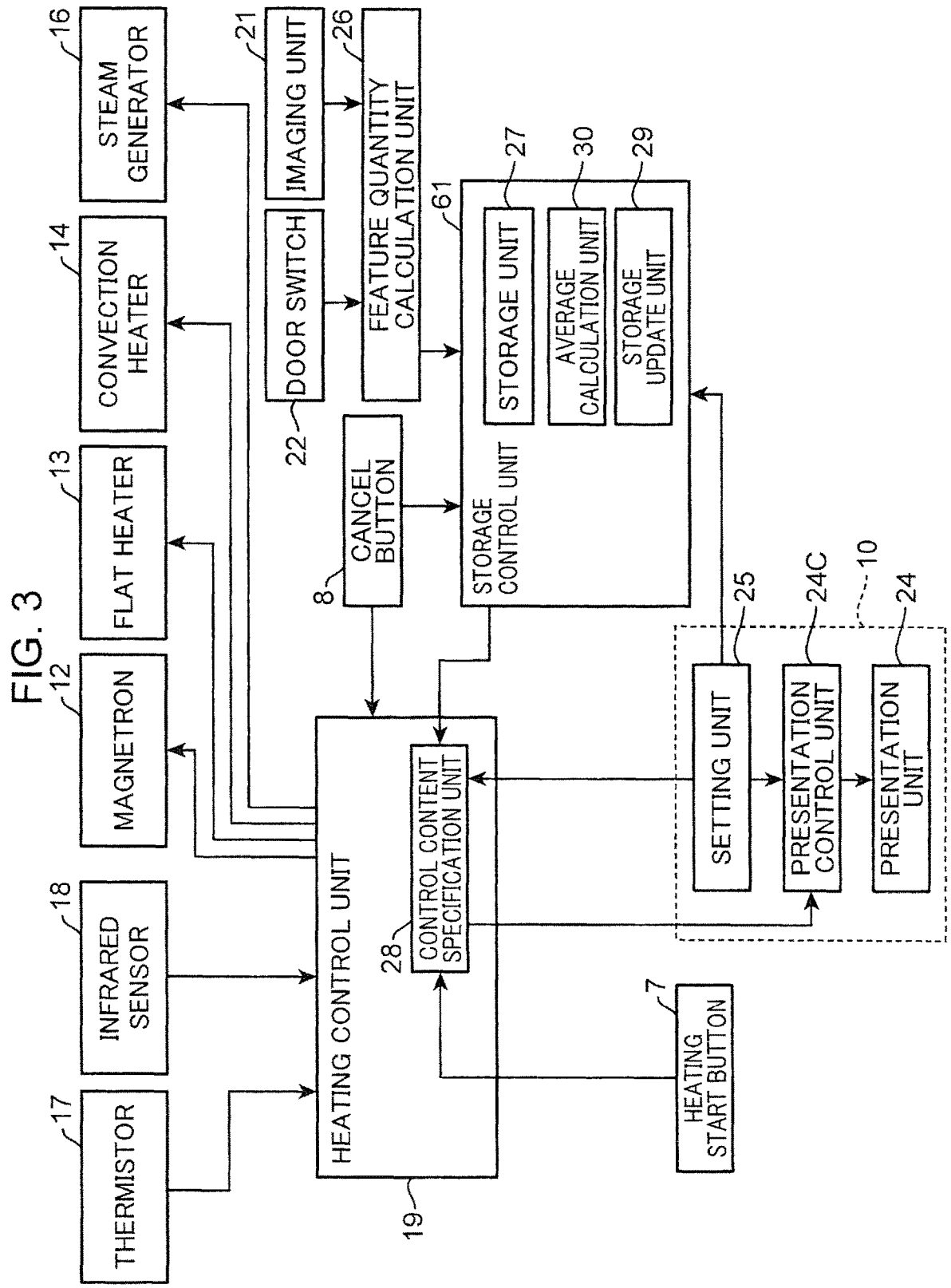
FIG. 3 is a control block diagram of the convection microwave oven according to Embodiment 1 of the present invention.

Next, control of the operation presentation unit 6 and the imaging unit 21 will be described using FIG. 3. FIG. 3 is a control block diagram of the convection microwave oven according to Embodiment 1 of the present invention.

The convection microwave oven shown in FIG. 3 includes the heating start button 7, the cancel button 8, the liquid crystal touch panel 10, the magnetron 12, the flat heater 13, the convection heater 14, the steam generator 16, the thermistor 17, the infrared sensor 18, the heating control unit 19, the imaging unit 21, the door switch 22, a feature quantity calculation unit 26, and a storage control unit 61.

The liquid crystal touch panel 10 includes a presentation unit 24 configured of, for example, a color liquid crystal panel, a presentation control unit 24C that controls content of presentation by the presentation unit 24, and a setting unit (acceptance unit) 25 configured of a touch panel. The presentation control unit 24C controls the presentation unit 24 through switching or the like of a screen presented with the presentation unit (color liquid crystal panel) 24 based on an operation signal or the like from the setting unit 25. The setting unit 25 accepts a user input relating to heating control content that defines a heating operation of the magnetron 12, the flat heater 13, the convection heater 14, or the steam generator 16. The heating start button 7 orders the start of heating operation to the magnetron 12, the flat heater 13, the convection heater 14, or the steam generator 16.

The feature quantity calculation unit 26 captures an image of food taken by the imaging unit 21 when the door has been closed by the door switch 22 as a still image and calculates the feature quantity of the captured still image. The feature quantity calculation unit 26 calculates the feature quantity of image data acquired by the imaging unit 21. One example of a calculation method of a feature quantity will be described later.

In this embodiment, the imaging unit 21 images the inside of the heating chamber 11 at a timing when closing of the door has been detected by the door switch 22. However, this disclosure is not limited as such, and it suffices for the imaging unit 21 to image the inside of the heating chamber 11 at a timing when food being housed within the heating chamber 11 has been detected.

The storage control unit 61 includes a storage unit (first storage unit) 27, a storage update unit (update unit) 29, and an average calculation unit (averaging processing unit) 30. The storage unit 27 stores a correspondence table in which the feature quantity of a still image calculated with the feature quantity calculation unit 26 and heating control content set with the setting unit 25 are associated with each other. The storage unit 27 stores control information (correspondence table) in which image data and heating control content corresponding to food specified from the image data are associated with each other. In this embodiment, the storage unit 27 stores a feature quantity and heating control content in a table format. However, the present invention is not particularly limited as such, and a feature quantity and heating control content may be stored in other formats.

The heating control unit 19 includes a control content specification unit 28. The control content specification unit 28 specifies heating control content associated with resembling image data that resembles image data acquired by the imaging unit 21, based on control information (correspondence table) stored in the storage unit 27. The control content specification unit 28 compares the feature quantity calculated with the feature quantity calculation unit 26 and the feature quantity stored in the storage unit 27 to extract and specify heating control content associated with the closest feature quantity. The presentation unit 24 presents the heating control content specified by the control content specification unit 28. The heating start button 7 orders the start of heating operation defined by the heating control content presented by the presentation unit 24.

The control content specification unit 28 determines whether or not resembling image data that resembles image data acquired by the imaging unit 21 is stored in the storage unit 27 and, in the case where the resembling image data is determined to be stored in the storage unit 27, specifies heating control content associated with the resembling image data based on control information stored in the storage unit 27. In the case where the control content specification unit 28 has determined that resembling image data is not stored in the storage unit 27, the setting unit 25 accepts a user input.

In the case of heating with presented heating control content upon a user seeing the heating control content presented with the presentation unit 24, the start of heating operation is ordered by the heating start button (start order unit) 7. In the case of changing the presented heating control content, the heating control content is changed by the setting unit 25, and the start of heating operation is ordered by the heating start button 7. The heating control unit 19 controls the magnetron 12, the flat heater 13, the convection heater 14, the steam generator 16, or the like to heat food using a detection result of the thermistor 17 or the infrared sensor 18, in accordance with the heating control content specified with the control content specification unit 28 or the heating control content changed by the user using the setting unit 25.

In the case where the heating control content specified by the control content specification unit 28 is changed by the user and the start of heating operation is ordered by the heating start button 7, the storage update unit 29 associates the feature quantity of the still image acquired by the imaging unit 21 and the changed heating control content with each other and updates the correspondence table within the storage unit 27. That is, when the setting unit 25 accepts a user input and then the heating start button 7 orders the start of heating operation, the storage update unit 29 associates the image data and the heating control content with each other and updates control information (correspondence table) within the storage unit 27. The storage update unit 29 associates the feature quantity calculated by the feature quantity calculation unit 26 and the heating control content with each other and updates control information (correspondence table) within the storage unit 27.

In the case where the heating control content specified by the control content specification unit 28 is not changed by the user and the start of heating operation is ordered by the heating start button 7, the average calculation unit 30 calculates an average feature quantity in which the feature quantity stored in the storage unit 27 and the feature quantity calculated from the still image captured this time by the feature quantity calculation unit 26 are averaged and updates the feature quantity in the correspondence table stored in the storage unit 27. That is, after the start of heating operation defined by the heating control content presented by the presentation unit 24 has been ordered by the heating start button 7, the average calculation unit 30 calculates average image data in which the image data acquired by the imaging unit 21 and the resembling image data stored in the storage unit 27 are averaged and stores the average image data in the storage unit 27 in association with the heating control content. By averaging the feature quantity of images, a noise component included in the feature quantity can be reduced. Therefore, the precision in specifying heating control content improves, and an environmental change such as a stain within the field of view of the imaging unit 21 that changes over time through long-term use can be dealt with.

In the case where the heating control content specified by the control content specification unit 28 is changed by the user, the start of heating operation is ordered by the heating start button 7, and the user has ordered cancellation with the cancel button 8 during heating to order the stoppage of heating operation, the storage update unit 29 erases a newly added and stored combination of the heating control content and the feature quantity of the still image from the correspondence table. That is, after the start of heating operation defined by the heating control content presented by the presentation unit 24 has been ordered by the heating start button 7, the cancel button (stop order unit) 8 orders the stoppage of heating operation to the magnetron 12, the flat heater 13, the convection heater 14, or the steam generator 16. In the case where the stoppage of heating operation has been ordered by the cancel button 8, the storage update unit 29 deletes the heating control content presented by the presentation unit 24 and the image data associated with the heating control content from the storage unit 27.

The user pressing the cancel button 8 to stop the heating operation means that the incorrectness of the heating control content set with the setting unit 25 has been recognized during the procedure. In the case where incorrect heating control content is stored in the correspondence table in association with the feature quantity of the still image of food, the heating control content undesired by a user is presented afterward upon similar food being put in the heating chamber. Therefore, in the case where the stoppage of heating operation has been ordered by the cancel button 8, the heating control content presented by the presentation unit 24 and the image data associated with the heating control content are deleted from the storage unit 27. Accordingly, incorrect heating control content being stored in the storage unit 27 can be prevented.

Next, a method of calculating a feature quantity from a still image will be described. The calculation method of a feature quantity is not limited to a specific calculation method. A still image taken by the imaging unit 21 is represented by a set of, for example, 640 (horizontal) by 480 (vertical) points. The color of each point forming the still image is acquired. The color of each point is acquired as the brightness in 1 byte of 0 to 255 for each element of three colors of red, green, and blue. The color of one point is represented in 3 bytes.

Focusing on red that is one color element, a count value representing the occurrence frequency of each brightness from 0 to 255 for red is calculated. The count value of the occurrence frequency is generally called a histogram. That is, each of the 640×480 points has one of values from 0 to 255 for red. Therefore, a histogram in which the number of points for each brightness of 0 to 255 has been counted is assumed as the feature quantity of red. In a similar manner, a histogram of green and a histogram of blue are calculated as the feature quantity. The feature quantity calculation unit 26 calculates histograms of three colors as the feature quantity.

Figure 4:
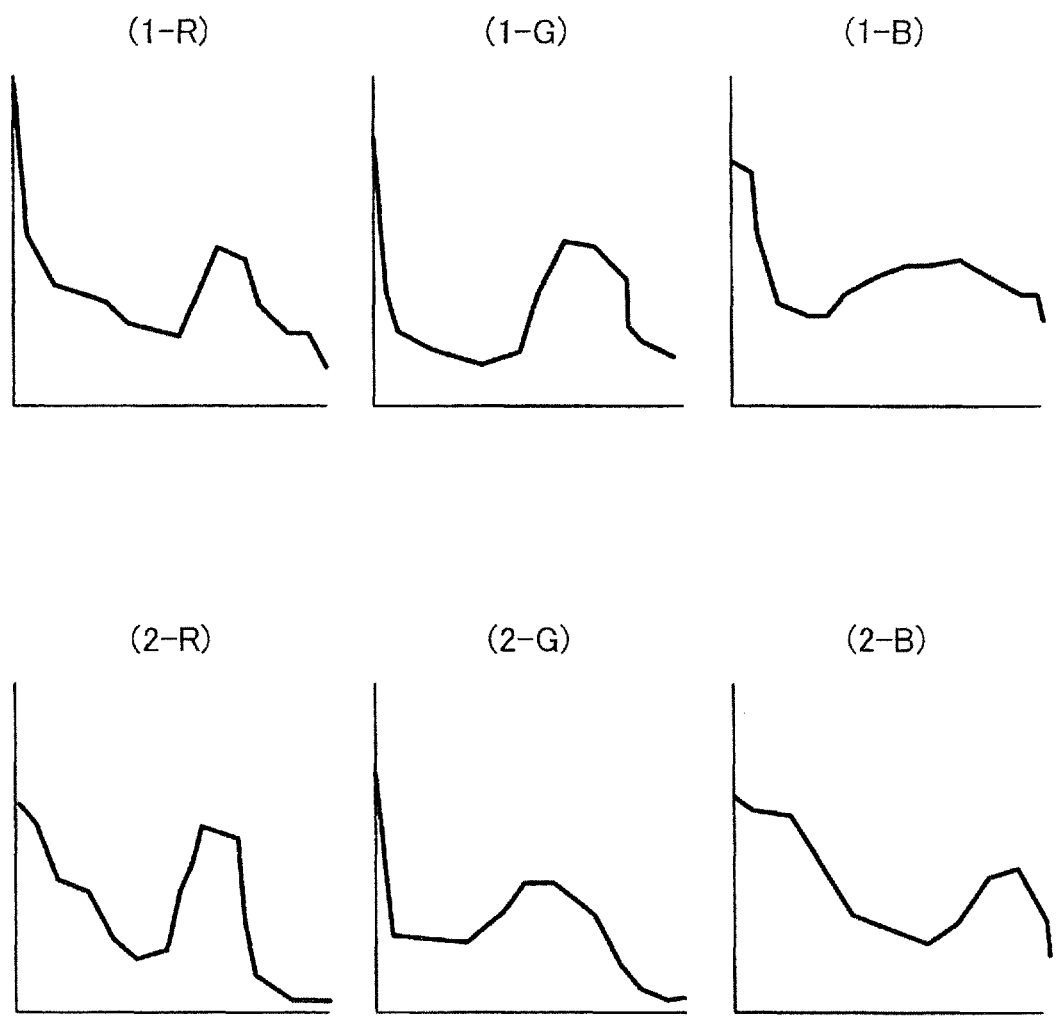
FIG. 4 is a diagram for illustrating a histogram.

Next, using FIG. 4 and FIG. 5, a histogram that is a feature quantity and the resemblance of two images will be described. FIG. 4 is a diagram for illustrating a histogram. In FIG. 4, (1-R) is a histogram of an element of red in a first image, (1-G) is a histogram of an element of green in the first image, and (1-B) is a histogram of an element of blue in the first image. In each histogram in FIG. 4, the abscissa shows the brightness. The brightness is represented by an integer from 0 to 255, 0 being the darkest and 255 being the brightest. The ordinate shows the occurrence frequency. In a similar manner, in FIG. 4, (2-R) is a histogram of an element of red in a second image that is different from the first image, (2-G) is a histogram of an element of green in the second image, and (2-B) is a histogram of an element of blue in the second image. In this manner, the feature quantity of one image can be represented by histograms of red, green, and blue.

Figure 5:
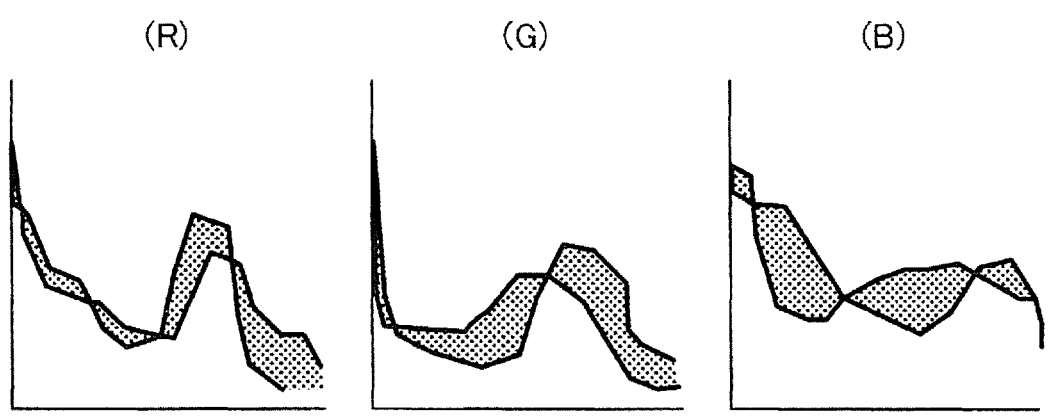
FIG. 5 is a diagram for illustrating the resemblance degree of two images.

FIG. 5 is a diagram for illustrating the resemblance degree of two images. In FIG. 5, the histogram of the first image and the histogram of the second image in FIG. 4 are superimposed. That is, in FIG. 5, (R) is a superimposition of the histogram of an element of red in the first image and the histogram of an element of red in the second image, (G) is a superimposition of the histogram of an element of green in the first image and the histogram of an element of green in the second image, and (B) is a superimposition of the histogram of an element of blue in the first image and the histogram of an element of blue in the second image. A portion represented by hatching is a portion where the histograms of the two images differ. The sum of the area of the differing portion is the resemblance degree. The sum of the area is large for two non-resembling images, and the sum of the area is small for two resembling images. In the case where the same two images have been compared, histograms of the two images become exactly equal. Since a differing portion is absent, the sum of the area is 0.

In this manner, the resemblance degree of two images can be evaluated quantitatively. That is, in the case where histograms of a plurality of images are stored in the storage unit 27 and one new image has been acquired, the feature quantity calculation unit 26 sequentially compares a histogram of the one new image and the stored histograms of the plurality of images to calculate the sum of the area of a differing portion, in order to check which image out of the plurality of stored images is most resembled, and selects an image with the smallest sum of the area as the most resembling image.

Figure 6:
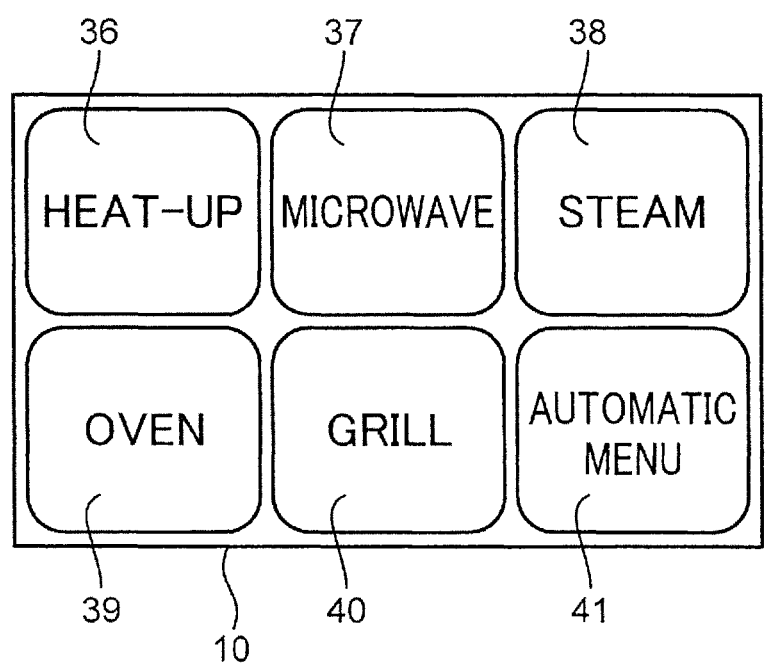
FIG. 6 is a diagram showing one example of a basic menu screen.

Next, using a screen displayed in the liquid crystal touch panel 10, the flow of operation of the convection microwave oven 1 in Embodiment 1 will be described. FIG. 6 is a diagram showing one example of a basic menu screen. The basic menu screen is a screen displayed first after power-on, for example. A display timing of the basic menu screen is not limited to the time of power-on. In the basic menu screen, a heat-up button 36, a microwave button 37, a steam button 38, an oven button 39, a grill button 40, and an automatic menu button 41 are displayed.

At the time of first use, the storage unit 27 does not store anything, since a chamber interior image has not been taken even once by the imaging unit 21. A user opens the door 3 of the convection microwave oven 1, puts food in, and closes the door 3. Since the door being closed is detected by the door switch 22 at that time, the imaging unit 21 acquires a chamber interior image as a still image. With the feature quantity calculation unit 26, a histogram (feature quantity) of the acquired still image is calculated, and the histogram is stored in the storage unit 27.

The user presses one of the buttons in the basic menu screen in FIG. 6 to specify heating control content. For example, in the case where cold rice served in a bowl is put in the heating chamber 11 of the convection microwave oven 1 to be heated, the user presses the heat-up button 36 in FIG. 6. At that time, the presentation control unit 24C switches the basic menu screen of the liquid crystal touch panel 10 to a temperature setting screen of setting the finishing temperature.

Figure 7:
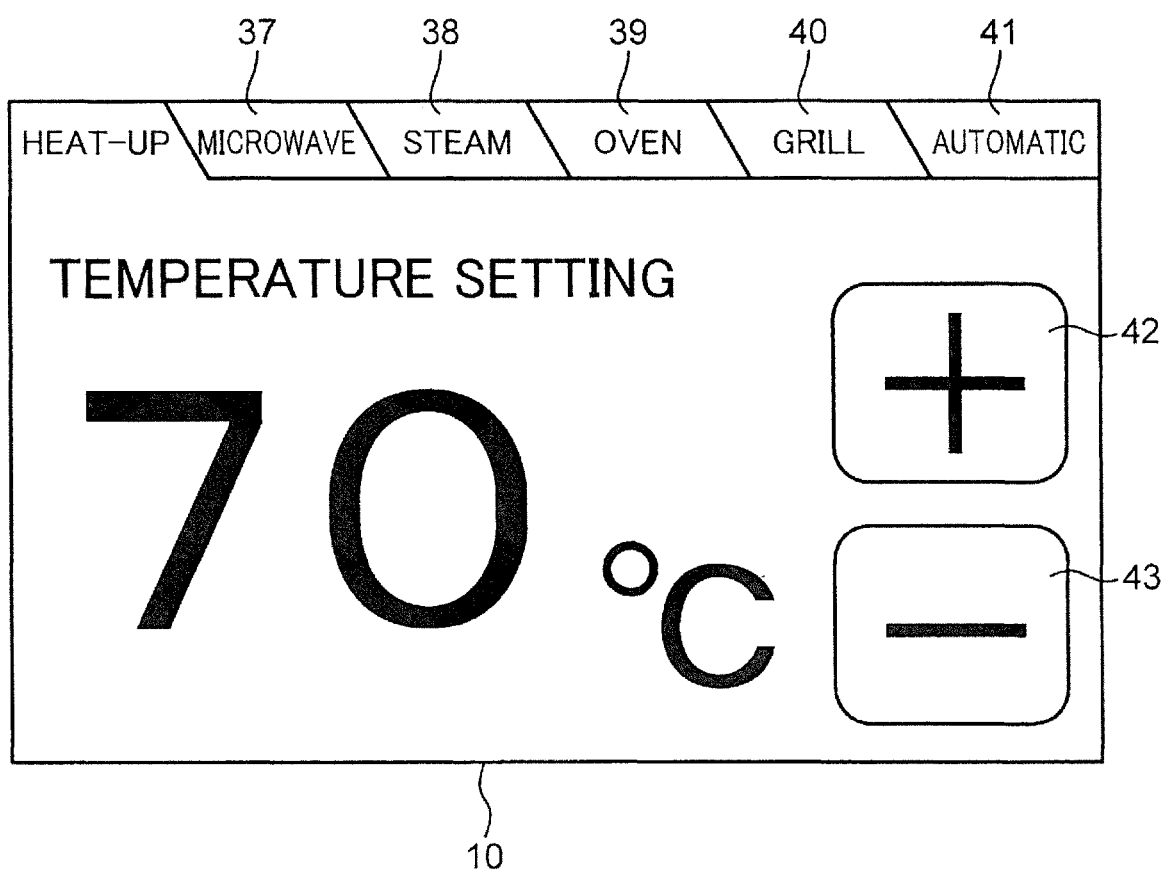
FIG. 7 is a diagram showing one example a temperature setting screen for setting the temperature upon heating food.

FIG. 7 is a diagram showing one example the temperature setting screen for setting the temperature upon heating food. In the middle of the temperature setting screen, a setting temperature is displayed. To the right of the setting temperature, a plus button 42 for increasing the setting temperature and a minus button 43 for decreasing the setting temperature are displayed. The setting temperature is settable at 5° C. intervals between 40 to 90° C., for example.

The user operates the plus button 42 and the minus button 43 while looking at the setting temperature of the screen to set a desired temperature. When the desired temperature (for example, 70° C.) is set, the user presses the heating start button 7 to start heating.

At this time, the storage unit 27 stores the histogram of the still image that has been acquired when the door has been closed and stored earlier and heating control content of "heat-up" and "70° C." set by the user in association with each other. The heating control unit 19 drives the magnetron 12 to heat the cold rice that is food up to 70° C. while monitoring the output of detection by the infrared sensor 18.

In FIG. 7, the microwave button 37, the steam button 38, the oven button 39, the grill button 40, and the automatic menu button 41 having similar functions as in FIG. 6 are displayed as tab buttons in the upper portion of the temperature setting screen. Therefore, a change can be made from the temperature setting screen to a screen for setting other heating control content.

Next, a case of heating Chinese pork dumplings (shumai) that is frozen food, for example, will be described. In the case of heating frozen food that is commonly sold, heating with setting content as indicated in the packaging of the frozen food is recommended, rather than heating using a sensor included in the convection microwave oven 1. The user arranges and wraps a plurality of pieces of shumai on a plate, closes the door 3 upon placement within the heating chamber 11, and presses the microwave button 37 shown in FIG. 6 to perform detailed setting.

Figure 8:
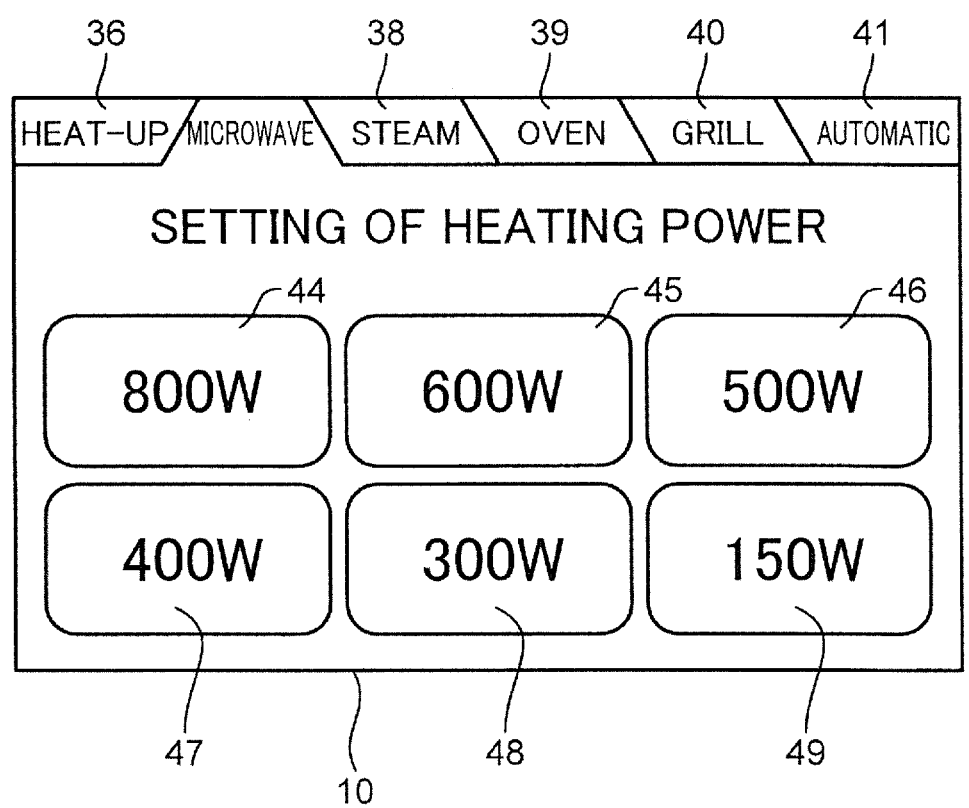
FIG. 8 is a diagram showing one example of a heating power setting screen for setting the heating power for a microwave.

FIG. 8 is a diagram showing one example of a heating power setting screen for setting the heating power for a microwave. The heating power setting screen for a microwave includes an 800 W button 44, a 600 W button 45, a 500 W button 46, a 400 W button 47, a 300 W button 48, and a 150 W button 49 as buttons to select the wattage. The user can select the heating power by pressing one of the buttons. For example, when the 500 W button 46 is pressed, setting of the heating time is accepted in the next screen.

Figure 9:
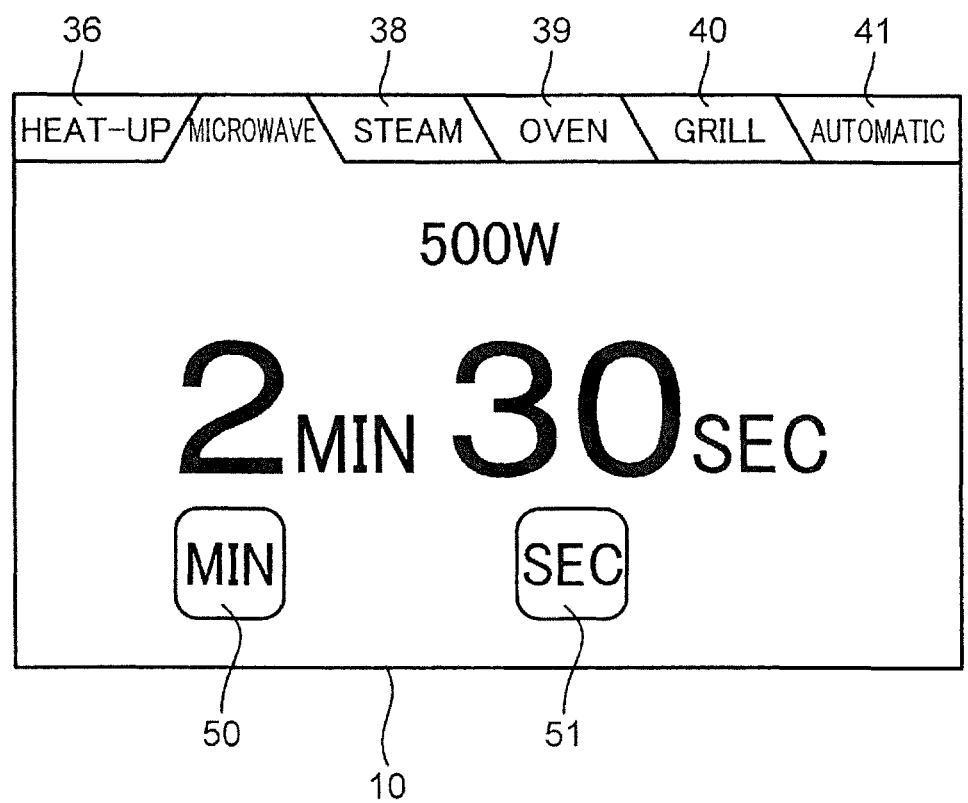
FIG. 9 is a diagram showing one example of a heating time setting screen for setting the heating time for a microwave.

FIG. 9 is a diagram showing one example of a heating time setting screen for setting the heating time for a microwave. In the middle of the heating time setting screen, the heating time is displayed. The heating time setting screen for a microwave includes a minute button 50 and a second button 51. By the minute button 50 being pressed, the displayed heating time is increased in units of 1 minute from 0 minutes to 9 minutes. Following 9, it returns to 0. By the second button 51 being pressed, the displayed heating time is increased in units of 10 seconds from 0 seconds to 50 seconds. Following 50, it returns to 0. In this manner, setting of the heating time is accepted, and a heating time of, for example, 2 minutes and 30 seconds is set. The user presses the heating start button 7 to start heating.

At this time, the storage unit 27 stores a histogram of a still image of shumai that has been acquired when the door has been closed and heating control content of "microwave, 500 W, 2 minutes and 30 seconds" set by the user in association with each other. The heating control unit 19 drives the magnetron 12 to heat the food at 500 W for 2 minutes and 30 seconds.

Next, a case of baking a cookie, for example, will be described. A cookie is generally baked using an oven. As a method of baking a cookie, there are a method in which dough is put and baked within the preheated heating chamber 11 and a method of baking without preheating. Herein, the method of baking without preheating will be described. When a user prepares cookie dough, the prepared dough is arranged on an oven dish and placed within the heating chamber 11. The user closes the door 3 and presses the oven button 39 shown in FIG. 6 to perform detailed setting.

Figure 10:
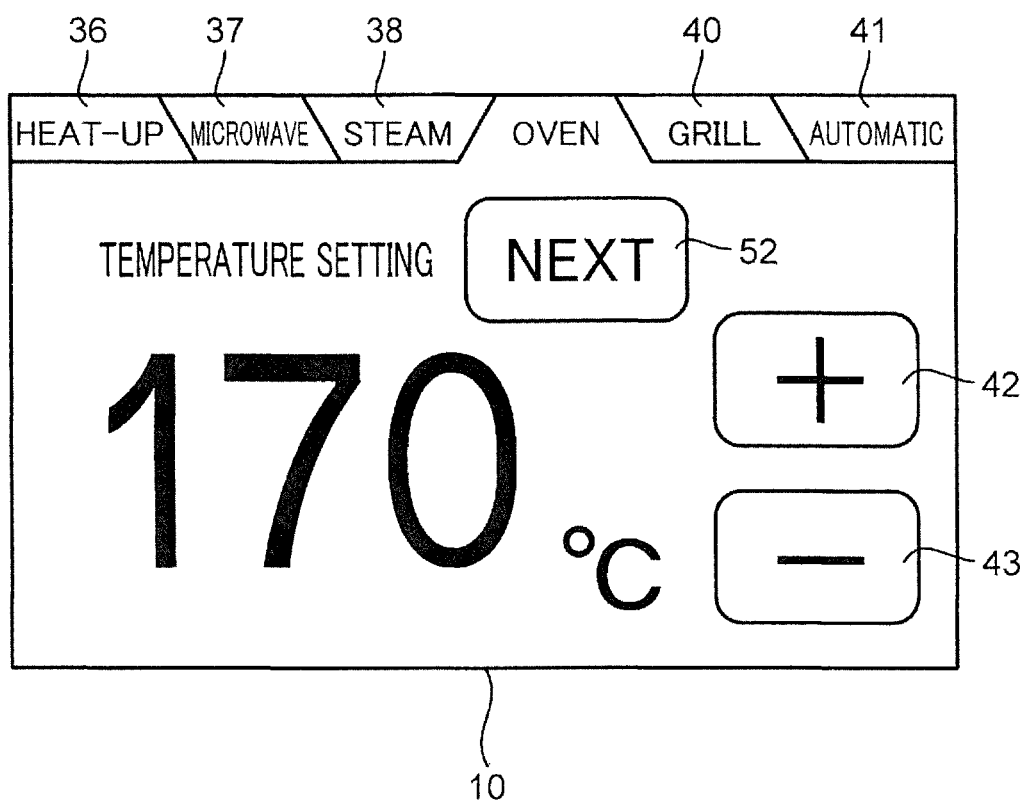
FIG. 10 is a diagram showing one example of a temperature setting screen for setting the temperature for an oven.

FIG. 10 is a diagram showing one example of a temperature setting screen for setting the temperature for an oven. In the middle of the temperature setting screen, the setting temperature is displayed. To the right of the setting temperature, the plus button 42 for increasing the setting temperature and the minus button 43 for decreasing the setting temperature are displayed. The setting temperature is settable at 10° C. intervals between 150 to 250° C., for example. The user operates the plus button 42 and the minus button 43 while looking at the setting temperature of the screen to set a desired temperature. For example, when 170° C. is set and a next button 52 is pressed, the presentation control unit 24C switches the screen of the liquid crystal touch panel 10 to a heating time setting screen.

Figure 11:
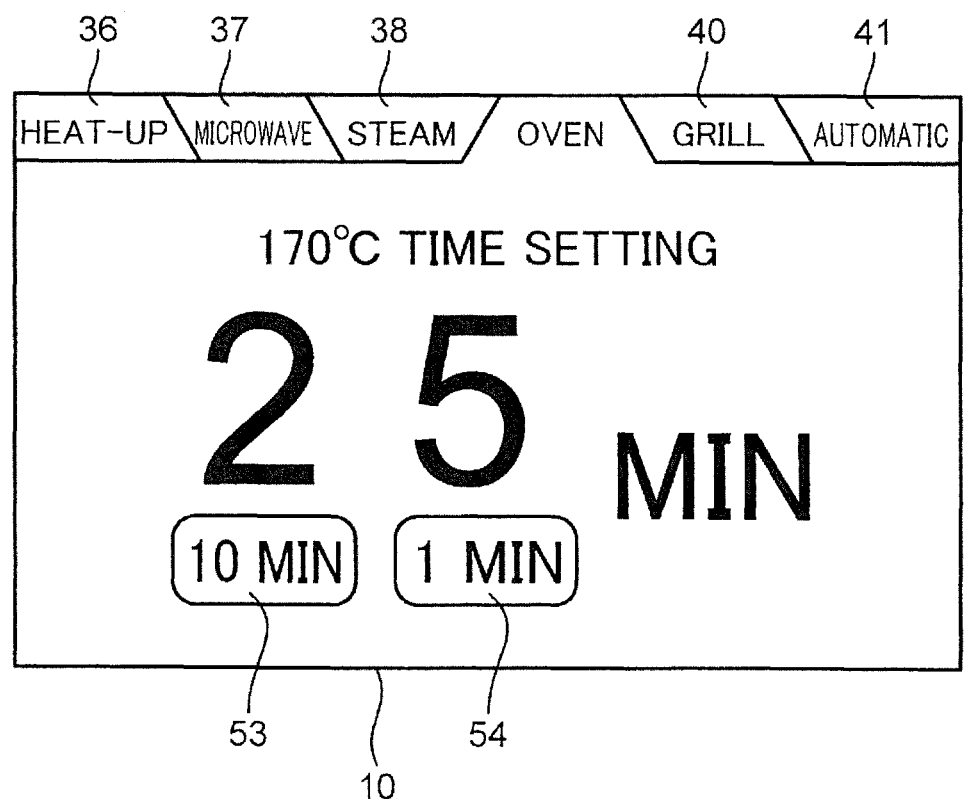
FIG. 11 is a diagram showing one example of a heating time setting screen for setting the heating time for an oven.

FIG. 11 is a diagram showing one example of the heating time setting screen for setting the heating time for an oven. In the middle of the heating time setting screen, the heating time is displayed. The heating time setting screen for an oven includes a 10-minute button 53 and a 1-minute button 54. By the 10-minute button 53 being pressed, the displayed heating time is increased in units of 10 minutes from 0 minutes to 90 minutes. Following 90, it returns to 0. By the 1-minute button 54 being pressed, the displayed heating time is increased in units of 1 minute from 0 minutes to 9 minutes. Following 9, it returns to 0. In this manner, setting of the heating time is accepted, and a heating time of, for example, 25 minutes is set. A user presses the heating start button 7 to start heating.

At this time, the storage unit 27 stores a histogram of a still image of cookie dough that has been acquired when the door has been closed and heating control content of "oven, 170° C., 25 minutes" set by the user in association with each other. The heating control unit 19 drives the circulation fan 15 and heats the inside of the heating chamber 11 with the convection heater 14. The heating control unit 19 performs heating for 25 minutes while controlling the convection heater 14 such that the temperature detected by the thermistor 17 becomes 170° C.

In addition, when the steam button 38 shown in FIG. 6 has been pressed, setting of the heating time for steam heating is accepted. When the grill button 40 has been pressed, setting of one of both-side grill or one-side grill and setting of the heating time are accepted. Further, when the automatic menu button 41 has been pressed, selection of a desired cooking menu out of a plurality of cooking menus such as "gratin," "hamburger steak," and "chicken teriyaki" is accepted. In either case, the storage unit 27 stores a histogram of a still image of the inside of the heating chamber 11 that has been acquired when the door has been closed and heating control content set by a user in association with each other at the point of starting heating.

Next, the operation of the convection microwave oven 1 when food is put within the heating chamber 11 and the door has been closed in a state where heating control content set by a user and a histogram of a still image of the inside of the heating chamber 11 are stored in the storage unit 27 in association with each other will be described. For example, assume that cold rice served in a bowl is placed in the heating chamber 11 and the door has been closed, in a state where the storage unit 27 stores three types of associations of a histogram and heating control content that are an association of a histogram of a still image of cold rice served in a bowl and heating control content of "heat-up, 70° C.," an association of a histogram of a still image of shumai arranged on a plate and heating control content of "microwave, 500 W, 2 minutes and 30 seconds," and an association of a histogram of a still image of cookies arranged on an oven dish and heating control content of "oven, 170° C., 25 minutes."

At this time, the feature quantity calculation unit 26 calculates a histogram from a still image taken by the imaging unit 21 when the door has been closed this time. The control content specification unit 28 calculates the resemblance degree of the three types of histograms stored in the storage unit 27 and the histogram calculated this time. The resemblance degree is the size of the area of a non-matching portion described with FIG. 5. A smaller area of the non-matching portion of two histograms indicates greater resemblance of the two histograms. With calculation of the resemblance, a histogram most resembling the histogram of the still image taken this time is the histogram of the still image of cold rise served in a bowl that is already stored. The reason is that the area of the non-matching portion of the two histograms is the smallest, since similar food is imaged in the still images.

The control content specification unit 28 specifies, as heating control content for this time, "heat-up, 70° C." stored in the storage unit 27 in association with the histogram of the still image of cold rice served in a bowl. The presentation unit (color liquid crystal panel) 24 displays the temperature setting screen in FIG. 7. That is, a screen of a state where an input operation of temperature has ended in the temperature setting screen in FIG. 7 is displayed, without the basic menu screen in FIG. 6 first being displayed. The user presses the heating start button 7, if the presented heating control content is not mistaken. When the heating start button 7 is pressed, the heating control unit 19 drives the magnetron 12 to heat the cold rice that is food up to 70° C. while monitoring the output of detection by the infrared sensor 18. The user can order a desired heating operation merely by pressing the heating start button 7 while omitting all operations of inputting heating control content during the procedure. A troublesome operation can be omitted.

By the heating start button 7 being pressed and the heating operation being started without the presented heating control content being changed, it can be seen that the heating control content specified by the control content specification unit 28 is correct. Therefore, the average calculation unit 30 calculates an average histogram in which the histogram of the still image acquired when the door has been closed this time and the histogram corresponding to the heating control content of "heat-up, 70° C." that is stored in the storage unit 27 are averaged and newly stores the average histogram in association with the heating control content of "heat-up, 70° C."

In a similar manner, as an example, a case will be described where a plate served with a cold grilled fish different from any one of three types of food is placed in the heating chamber 11 and the door has been closed, in a state where the storage unit 27 stores three types of associations of a histogram and heating control content that are an association of a histogram of a still image of cold rice served in a bowl and heating control content of "heat-up, 70° C.," an association of a histogram of a still image of shumai arranged on a plate and heating control content of "microwave, 500 W, 2 minutes and 30 seconds," and an association of a histogram of a still image of cookies arranged on an oven dish and heating control content of "oven, 170° C., 25 minutes."

Since flesh of a grilled fish easily pops when heated at high temperature, heating is desirably at about 60° C. that is lower than the temperature upon heating rice. Therefore, a user desires to set heating control content of "heat-up 60° C." The feature quantity calculation unit 26 calculates a histogram from a still image taken by the imaging unit 21 when the door has been closed this time. The control content specification unit 28 calculates the resemblance degree of the three types of histograms already stored in the storage unit 27 and the histogram calculated this time. With calculation of the resemblance, there is a possibility of determination that a histogram most resembling the histogram of the still image taken this time is the histogram of the still image of shumai arranged on a plate, for example, that is already stored. Since the grilled fish and the shumai share in common that food is arranged on a plate, it is likely that the resemblance is determined to be the highest out of the three types in color distribution.

Thus, the control content specification unit 28 specifies "microwave, 500 W, 2 minutes and 30 seconds" that is stored in association with the histogram of the still image of shumai arranged on a plate as heating control content for this time. The presentation unit (color liquid crystal panel) 24 displays the heating time setting screen in FIG. 9. Since the presented heating control content is not a setting desired by the user, the user presses the cancel button 8. When the cancel button 8 is pressed, the presentation unit 24 displays the basic menu screen shown in FIG. 6. The user presses the heat-up button 36 in the basic menu screen. Next, the user operates the plus button 42 and the minus button 43 to bring the setting temperature to 60□C in the temperature setting screen in FIG. 7. The user presses the heating start button 7 to start heating.

By the heating start button 7 being pressed and a heating operation being started with the presented heating control content being changed, it can be seen that the heating control content specified by the control content specification unit 28 has been an error. Therefore, the storage update unit 29 newly adds and stores the histogram of the still image of a grilled fish on a plate and the changed heating control content of "heat-up, 60° C." in the storage unit 27 in association with each other. Accordingly, when a grilled fish on a plate is placed in the heating chamber 11 and the door has been closed next time in a similar manner to this time, the control content specification unit 28 extracts the histogram of the still image of a grilled fish on a plate as a histogram most resembling a histogram of an acquired still image. The control content specification unit 28 specifies "heat-up, 60° C." associated with the extracted histogram as heating control content.

In this manner, mistaken heating control content is displayed in the presentation unit 24 the first time, but heating control content in accordance with an object is displayed in the presentation unit 24 the second time and thereafter. Therefore, a user can order a heating operation merely by pressing the heating start button 7, and a troublesome operation can be omitted.

Herein, the control content specification unit 28 has specified the heating control content associated with the histogram of shumai with the highest resemblance degree, when the image of a grilled fish that is not stored in the storage unit 27 has been acquired. However, this disclosure is not limited as such. It may be such that, in the case where the resemblance of a histogram with the highest resemblance degree is not greater than or equal to a predetermined value, i.e., in the case where the area of a non-matching portion shown in FIG. 5 is not less than or equal to a predetermined value, the control content specification unit 28 does not specify heating control content, and the presentation unit 24 displays the basic menu screen shown in FIG. 6. In this case, there is an effect that work of pressing the cancel button 8 when presented heating control content is mistaken can be omitted.

Figure 12:
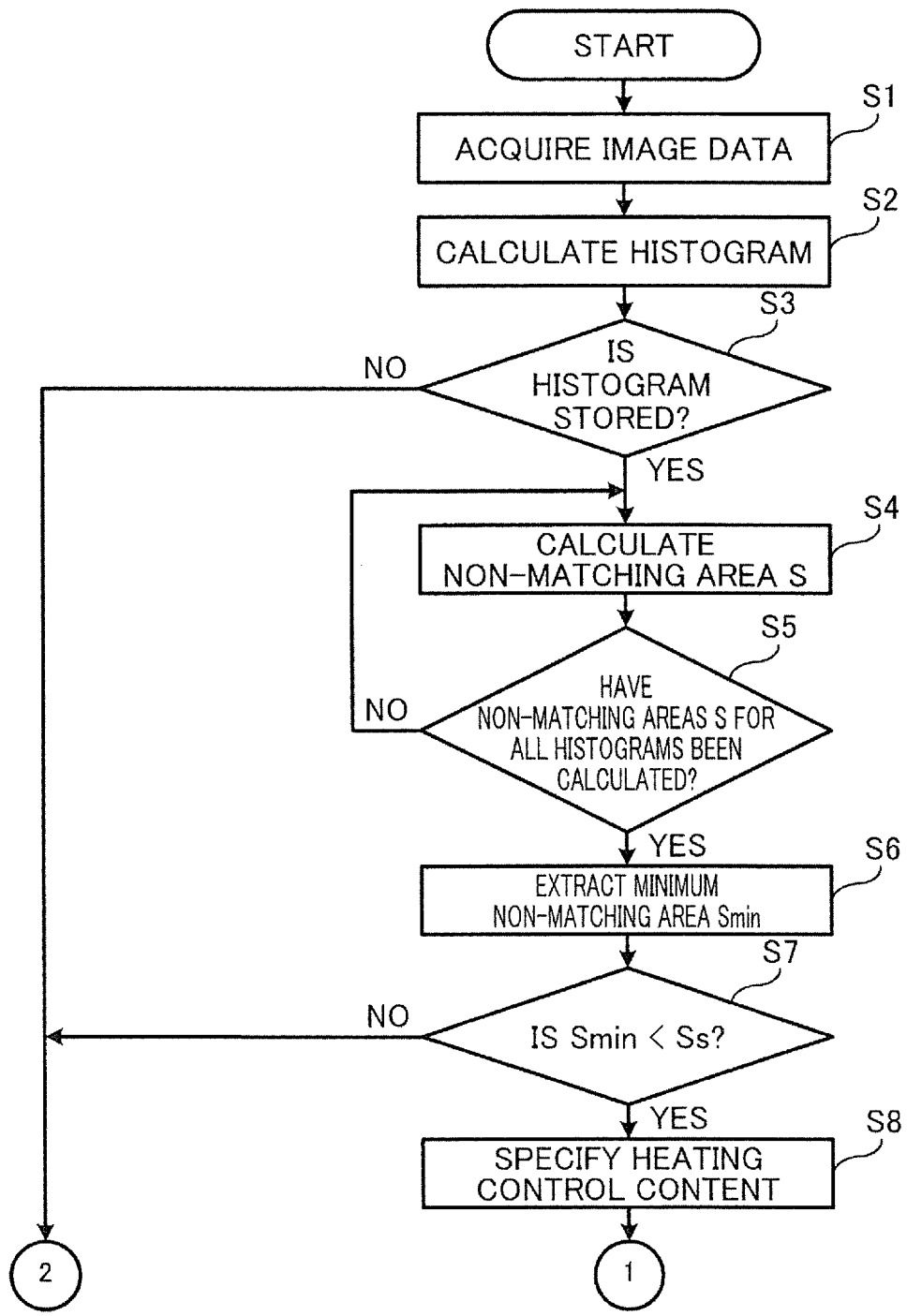
FIG. 12 is a first flowchart for illustrating the overall flow of operation of the convection microwave oven in Embodiment 1.
Figure 13:
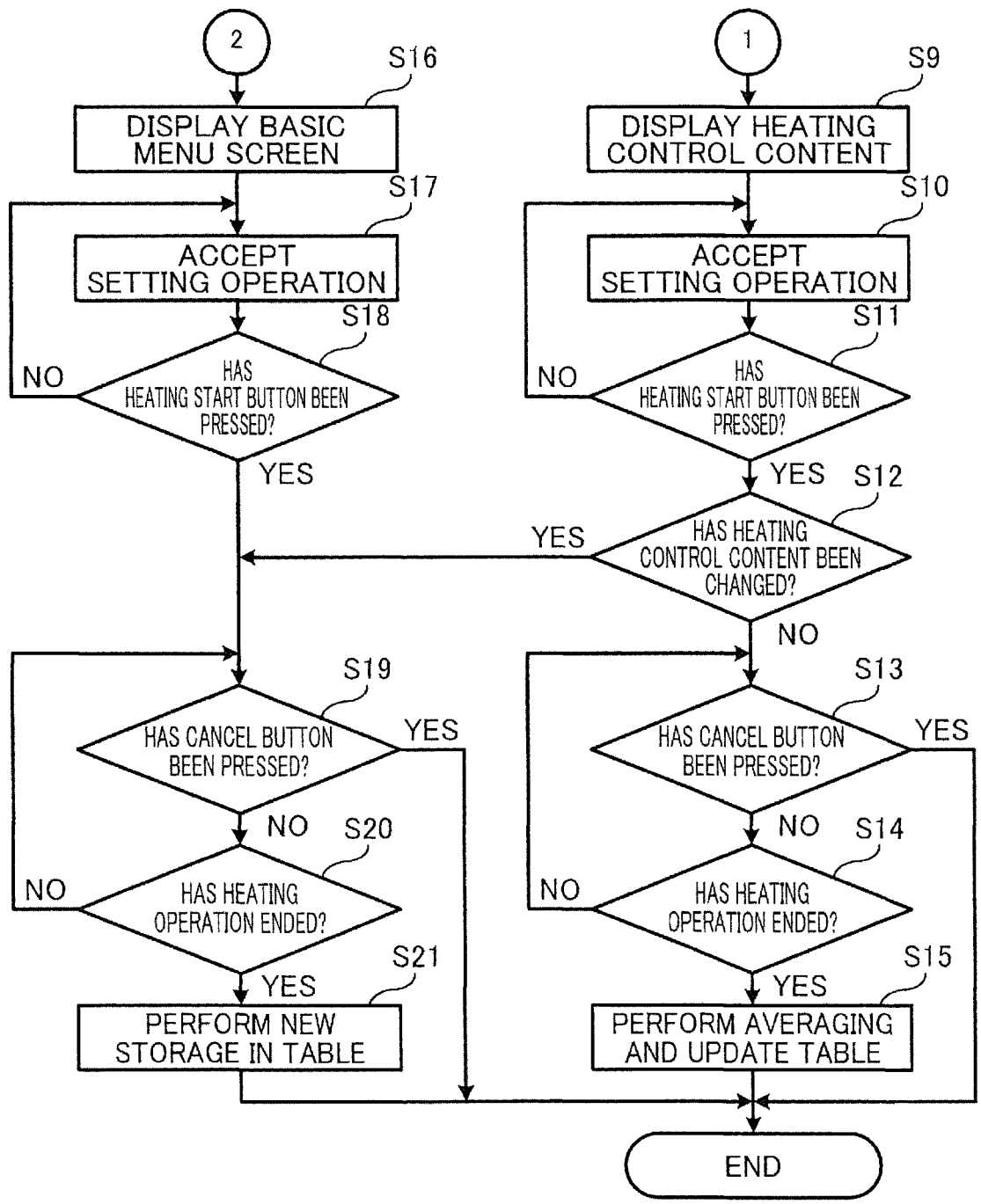
FIG. 13 is a second flowchart for illustrating the overall flow of operation of the convection microwave oven in Embodiment 1.

Next, using a flowchart in FIG. 12 and FIG. 13, the overall flow of operation of the convection microwave oven 1 in Embodiment 1 will be described. FIG. 12 is a first flowchart for illustrating the overall flow of operation of the convection microwave oven in Embodiment 1. FIG. 13 is a second flowchart for illustrating the overall flow of operation of the convection microwave oven in Embodiment 1. Herein, the flow of operation from detection by the door switch 22 that the door 3 has been closed after the door 3 has been opened and food has been housed within the heating chamber 11 will be described.

When the door switch 22 detects that the door 3 has been closed, the imaging unit 21 images the food housed within the heating chamber 11 to acquire image data (still image) in step S1.

Next, in step S2, the feature quantity calculation unit 26 calculates a histogram shown in FIG. 4 from the acquired image data.

Next, in step S3, the control content specification unit 28 determines whether or not a histogram is stored in the storage unit 27. For example, in the case where the convection microwave oven 1 is used for the first time, the correspondence table of the storage unit 27 is in an empty state, and a resembling histogram cannot be extracted. In the case where it is determined that a histogram is stored in the storage unit 27 (YES in step S3), it proceeds to the process in step S4. In the case where it is determined that a histogram is not stored in the storage unit 27 (NO in step S3), it proceeds to the process in step S16.

Next, in step S4, the control content specification unit 28 calculates a non-matching area S of the histogram stored in the storage unit 27 and the histogram calculated in step S2. The non-matching area S is an area of a hatching portion described with FIG. 5 and is a difference area of the two histograms. It can be said that a smaller non-matching area S indicates greater resemblance of the two histograms, i.e., greater resemblance of two still images from which the histograms have originated.

Next, in step S5, the control content specification unit 28 determines whether or not the non-matching areas S for all histograms stored in the storage unit 27 have been calculated. In the case where it is determined that the non-matching areas S for all histograms have not been calculated (NO in step S5), it returns to the process in step S4, and the control content specification unit 28 calculates the non-matching areas S of a different histogram stored in the storage unit 27 and the histogram calculated in step S2. In the case where n histograms are stored in the storage unit 27, n non-matching areas S are calculated.

In the case where it is determined that the non-matching areas S for all histograms have been calculated (YES in step S5), the control content specification unit 28 extracts a minimum non-matching area Smin that is the smallest area out of all of the (n) calculated non-matching areas S.

Next, in step S7, the control content specification unit 28 determines whether or not the extracted minimum non-matching area Smin is smaller than a predetermined area Ss. This process is a process for determining whether or not there is at least a certain degree of resemblance in the most resembling histogram. If the most resembling histogram is not a histogram with at least a certain degree of resemblance, it is likely that food is different. Therefore, it is determined that a histogram of image data of the food housed in the heating chamber 11 is not stored in the storage unit 27. In the case where it is determined that the minimum non-matching area Smin is smaller than the predetermined area Ss in step S7 (YES in step S7), it proceeds to the process in step S8. In the case where it is determined that the minimum non-matching area Smin is not smaller than the predetermined area Ss, i.e., in the case where it is determined that the minimum non-matching area Smin is greater than or equal to the predetermined area Ss (NO in step S7), it proceeds to the process in step S16.

Next, in step S8, the control content specification unit 28 specifies heating control content stored in association with the histogram used upon calculating the non-matching area S extracted as the minimum non-matching area Smin. The heating control content is, for example, "heat-up, 70° C.," "microwave, 500 W, 2 minutes and 30 seconds," or "oven, 170° C., 25 minutes." The heating control content is constituted by, for example, a heating method, heating power, heating temperature, and heating time.

Next, in step S9, the presentation unit 24 displays the heating control content specified by the control content specification unit 28. A screen displayed by the presentation unit 24 is, for example, the screen shown in FIG. 7, FIG. 9, or FIG. 11.

Next, in step S10, the setting unit 25 accepts a setting operation by a user with respect to the heating control content.

Next, in step S11, the control content specification unit 28 determines whether or not the heating start button 7 has been pressed. The setting unit 25 accepts the setting operation of the user in step S10 until the heating start button 7 is pressed. That is, in the case where it is determined that the heating start button 7 has not been pressed (NO in step S11), it returns to the process in step S10. The setting operation of the user is an operation of pressing the cancel button 8 and setting different heating control content, in the case where the heating control content displayed in step S9 is different from content desired by the user. In the case where it is determined that the heating start button 7 has been pressed by the control content specification unit 28 in step S11 (YES in step S11), it proceeds to the process in step S12.

Next, in step S12, the control content specification unit 28 starts heating and determines whether or not the heating control content has been changed by the user in step S10. A case where it is determined that the heating control content has not been changed (NO in step S12) is a case where the heating control content displayed in step S9 and the content desired by the user match, and it proceeds to the process in step S13. A case where it is determined that the heating control content has been changed (YES in step S12) is a case where the heating control content displayed in step S9 and the content desired by the user differ, and it proceeds to the process in step S19.

Next, in step S13, the heating control unit 19 determines whether or not the cancel button 8 has been pressed. In the case where it is determined that the cancel button 8 has not been pressed (NO in step S13), the heating control unit 19 determines whether or not a heating operation has ended in step S14. In the case where it is determined that the heating operation has not ended (NO in step S14), the heating control unit 19 returns to the process in step S13 and determines whether or not the cancel button 8 has been pressed by the user. The heating control unit 19 continues to check whether or not the cancel button 8 has been pressed by the user, until it is determined that the heating operation has ended in step S14.

In the case where it is determined by a timer that a predetermined time has passed without the cancel button 8 being pressed, or in the case where it is determined by the infrared sensor 18 that a predetermined temperature has been reached, the heating control unit 19 ends the heating operation and proceeds to the process in step S15. In the case where it is determined that the cancel button 8 has been pressed (YES in step S13), the heating control unit 19 stops the heating operation and ends the process.

In the case where it is determined that the heating operation has ended (YES in step S14), the average calculation unit 30 averages the histograms and updates the correspondence table within the storage unit 27 in step S15. In the case where the heating operation has been performed all the way with the heating control content displayed in step S9, the heating control content matches with the content desired by the user. An averaging process is a process in which the histogram stored in the storage unit 27 and the histogram calculated in step S2 are added and divided by 2. When the process in step S15 ends, the operation of the convection microwave oven 1 is ended.

In the case where it is determined that a histogram is not stored in the storage unit 27 in step S3, or in the case where it is determined that the minimum non-matching area Smin is not smaller than the predetermined area Ss in step S7, the presentation control unit 24C controls the presentation unit 24 to display the basic menu screen shown in FIG. 6 that is a default starting screen, and the presentation unit 24 displays the basic menu screen in step S16.

Next, in step S17, the setting unit 25 accepts a setting operation relating to heating control content by the user.

Next, in step S18, the control content specification unit 28 determines whether or not the heating start button 7 has been pressed. The setting unit 25 accepts the setting operation of the user in step S17 until the heating start button 7 is pressed. That is, in the case where it is determined that the heating start button 7 has not been pressed (NO in step S18), it returns to the process in step S17. The setting operation of the user includes a setting operation in a screen displayed following pressing of one of the buttons in the basic menu screen shown in FIG. 6 and is an operation up to confirmation of the heating control content. In the case where it is determined that the heating start button 7 has been pressed by the control content specification unit 28 (YES in step S18), it proceeds to the process in step S19.

Next, in step S19, the heating control unit 19 determines whether or not the cancel button 8 has been pressed. In the case where it is determined that the cancel button 8 has not been pressed (NO in step S19), the heating control unit 19 determines whether or not a heating operation has ended in step S20. In the case where it is determined that the heating operation has not ended (NO in step S20), it returns to the process in step S19, and whether or not the cancel button 8 has been pressed by the user is determined. That is, the heating control unit 19 continues to check whether or not the cancel button 8 has been pressed by the user, until it is determined that the heating operation has ended in step S20.

In the case where it is determined that the cancel button 8 has been pressed (YES in step S19), the heating control unit 19 stops the heating operation and ends the process.

In the case where it is determined that the heating operation has ended (YES in step S20), it proceeds to the process in step S21. That is, in the case where it is determined that the time measured by a timer has passed by a predetermined time without the cancel button 8 being pressed, or in the case where it is determined that the temperature measured by the infrared sensor 18 has reached a predetermined temperature, the heating control unit 19 ends the heating operation and proceeds to the process in step S21.

Next, in step S21, the storage update unit 29 newly stores the histogram calculated in step S2 and the heating control content set in step S17 in the table in the storage unit 27 in association with each other, since heating has ended all the way with the heating control content set in step S17. When the process in step S21 ends, the operation of the convection microwave oven 1 is ended.

The averaging process by the average calculation unit 30 may be such that two histograms are added and divided by 2 for the second process, and a histogram in which the histogram in the storage unit 27 is doubled and a histogram for this time are added and divided by 3 for the third process. The histogram in the storage unit 27 may be weighted for averaging, depending on the number of processes.

Embodiment 2

The external appearance of a convection microwave oven in Embodiment 2 is the same as the external appearance of the convection microwave oven in Embodiment 1 shown in FIG. 1, and therefore description is omitted. The schematic configuration of the convection microwave oven in Embodiment 2 is the same as the schematic configuration of the convection microwave oven in Embodiment 1 shown in FIG. 2, and therefore description is omitted.

Figure 14:
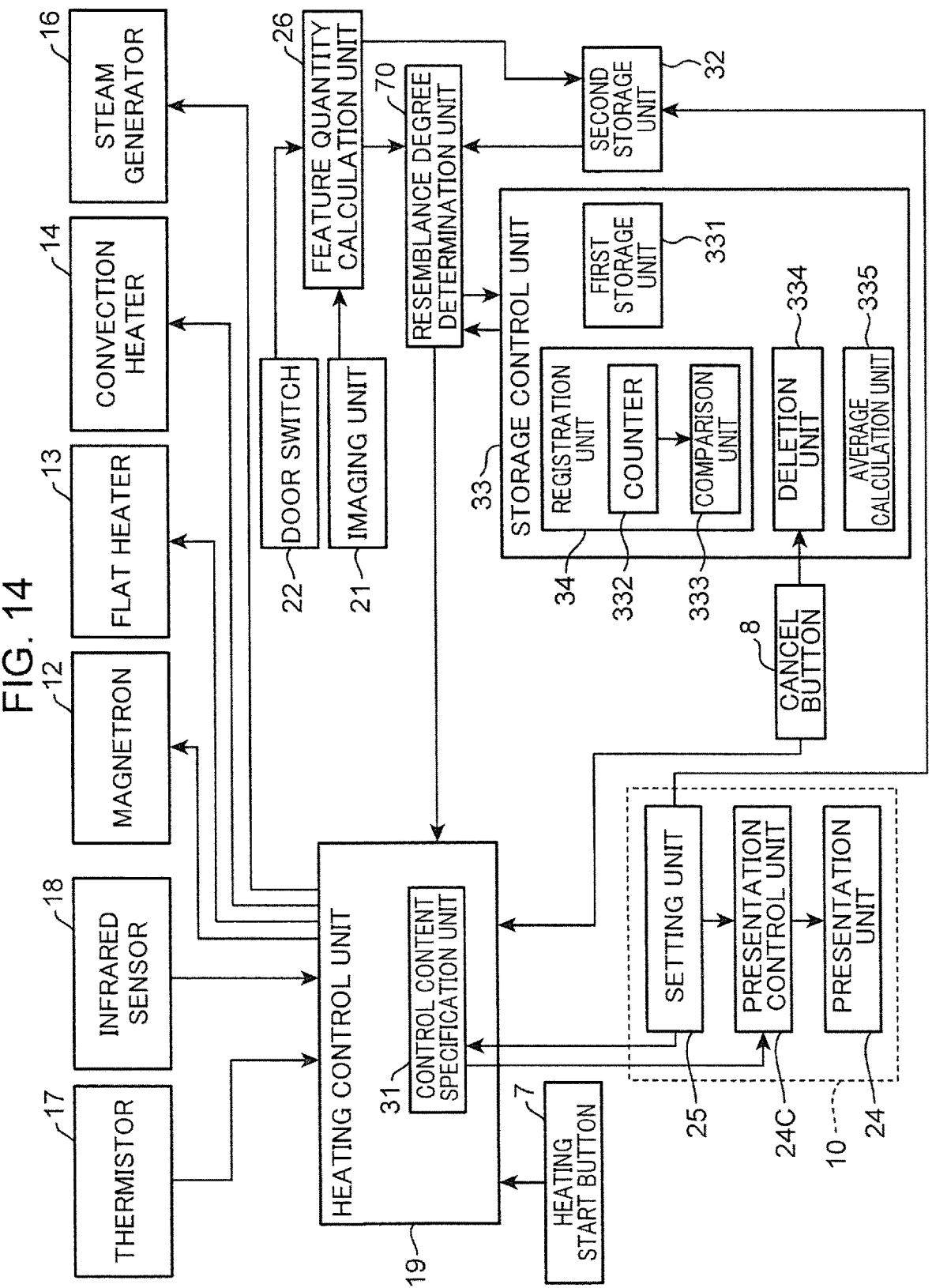
FIG. 14 is a control block diagram of a convection microwave oven according to Embodiment 2 of the present invention.

Next, control of the operation presentation unit 6 and the imaging unit 21 will be described using FIG. 14. FIG. 14 is a control block diagram of the convection microwave oven according to Embodiment 2 of the present invention. In FIG. 14, the same reference numeral is assigned and description is omitted for the same configuration as in the convection microwave oven in Embodiment 1.

The convection microwave oven shown in FIG. 14 includes the heating start button 7, the cancel button 8, the liquid crystal touch panel 10, the magnetron 12, the flat heater 13, the convection heater 14, the steam generator 16, the thermistor 17, the infrared sensor 18, the heating control unit 19, the imaging unit 21, the door switch 22, the feature quantity calculation unit 26, a resemblance degree determination unit 70, a second storage unit 32, and a storage control unit 33.

The second storage unit 32 stores a correspondence table in which the feature quantity of a still image calculated by the feature quantity calculation unit 26 and heating control content set by the setting unit 25 are associated with each other. The correspondence table stores combinations of feature quantities of still images and heating control content corresponding to the last predetermined number of times. The correspondence table stores combinations of feature quantities of still images and heating control content corresponding to 100 times, for example. Upon calculating the feature quantity of a new still image, the feature quantity calculation unit 26 stores the feature quantity of the still image in the second storage unit 32 and deletes the oldest combination of a feature quantity of a still image and heating control content from the second storage unit 32. The second storage unit 32 consistently stores the newest correspondence table in which feature quantities of still images and heating control content corresponding to the last predetermined number of times are associated with each other. The second storage unit 32 stores heating control content and a plurality of types of image data associated with the heating control content.

The storage control unit 33 includes a registration unit 34, a first storage unit 331, a deletion unit 334, and an average calculation unit 335. The registration unit 34 includes a counter 332 and a comparison unit 333.

The first storage unit 331 stores a correspondence table in which the feature quantity of a still image appearing frequently within the second storage unit 32 and heating control content are associated with each other. When the door 3 is closed, image data of food is acquired by the imaging unit 21, and the feature quantity of the acquired image data is calculated by the feature quantity calculation unit 26, the resemblance degree determination unit 70 sequentially calculates the resemblance degree of the calculated feature quantity and all feature quantities within the correspondence table stored in the first storage unit 331. In the case where the highest calculated resemblance degree is greater than or equal to a predetermined resemblance degree, the resemblance degree determination unit 70 sends the heating control content stored in association with the most resembling feature quantity to a control content specification unit 31 of the heating control unit 19.

In the case where the highest calculated resemblance degree is not greater than or equal to the predetermined resemblance degree, the resemblance degree determination unit 70 does not send the heating control content to the control content specification unit 31. In this case, a user sets heating control content using the setting unit 25 while looking in a screen displayed in the presentation unit 24. With the setting unit 25, the heating control content set by the user is sent to the control content specification unit 31 and also sent to the second storage unit 32.

The second storage unit 32 stores a correspondence table in which the feature quantity of image data of food acquired by the imaging unit 21 when the door 3 has been closed and heating control content set by the user are associated with each other. In the case where a combination having the same heating control content as heating control content newly stored in the correspondence table is already stored in the correspondence table, the resemblance degree determination unit 70 extracts all such combinations from the second storage unit 32. The resemblance degree determination unit 70 sequentially calculates the resemblance degree of a newly calculated feature quantity and an already-stored feature quantity extracted from the second storage unit 32 and, if the resemblance degree is greater than or equal to a predetermined resemblance degree, sequentially sends the combination of the feature quantity and the heating control content to the registration unit 34.

The resemblance degree determination unit 70 extracts a plurality of types of resembling image data that resemble each other from a plurality of types of image data. In the case where the acquisition frequency of the plurality of types of image data exceeds a predetermined value, the registration unit 34 registers the heating control content and the plurality of types of resembling image data in the first storage unit 331 in association with each other. The registration unit 34 calculates a count value representing the number of the extracted plurality of types of resembling image data. In the case where the count value exceeds a predetermined value, the heating control content and the plurality of types of resembling image data are stored in the first storage unit 331 in association with each other.

A case where the acquisition frequency of the plurality of types of resembling image data exceeds a predetermined value is not only a case where the number of the extracted plurality of types of resembling image data exceeds a predetermined value, but may be a case where the proportion of the number of the extracted plurality of types of resembling image data with respect to the number of all image data stored in the second storage unit 32 exceeds a predetermined value, or may be a case where the number of the plurality of types of resembling image data within a predetermined period exceeds a predetermined value.

The counter 332 calculates a count value representing the number of combinations sent by the resemblance degree determination unit 70. The comparison unit 333 compares whether or not the count value of the counter 332 is greater than or equal to a predetermined value. If the count value is greater than or equal to the predetermined value, the comparison unit 333 registers (stores) a corresponding combination of feature quantity and heating control content in the correspondence table of the first storage unit 331. Herein, there are a plurality of combinations to be registered, and the heating control content in the plurality of combinations is all the same. However, feature quantities in the plurality of combinations are not all the same, although there is resemblance. Therefore, the average calculation unit 335 calculates an average value of the plurality of feature quantities and registers the average value in the correspondence table in association with the heating control content.

The predetermined value to be compared with the count value is set to, for example, 5 times. Accordingly, in the case where the number of times of heating with the same heating control content for the same food among 100 times of heating operations recently performed is greater than or equal to 5 times, the registration unit 34 registers the combination in the first storage unit 331, since the frequency of the same heating operation being performed is high. In the case where the number of times of heating with the same heating control content for the same food is less than 5 times, the registration unit 34 does not register the combination in the first storage unit 331, since the frequency of the same heating operation being performed is low. Since the average value of the plurality of feature quantities is calculated by the average calculation unit 335, a noise component can be reduced.

In the case where heating control content stored in the first storage unit 331 is sent to the control content specification unit 31 from the resemblance degree determination unit 70, the control content specification unit 31 presents the received heating control content with the presentation unit 24. The control content specification unit 31 specifies the heating control content received from the resemblance degree determination unit 70 as the heating control content presented to the user. The presentation unit 24 presents the heating control content specified by the control content specification unit 31. In the case of heating with the presented heating control content upon the user seeing the heating control content presented with the presentation unit 24, the start of heating operation is ordered by the heating start button (start order unit) 7. In the case of changing the presented heating control content, the cancellation of heating operation is ordered by the cancel button 8, heating control content is newly set by the setting unit 25, and the start of heating operation is ordered by the heating start button 7.

With the control content specification unit 31, there are a case where heating control content sent from the resemblance degree determination unit 70 is specified without change, a case where heating control content sent from the resemblance degree determination unit 70 is cancelled by the cancel button 8, changed by the setting unit 25, and specified, and a case where heating control content is not sent from the resemblance degree determination unit 70 but specified by the setting unit 25. In either case, the heating control unit 19 controls the magnetron 12, the flat heater 13, the convection heater 14, the steam generator 16, or the like that is a heating unit to heat food using a detection result of the thermistor 17 or the infrared sensor 18, in accordance with the heating control content specified with the control content specification unit 31.

In the case where heating control content stored in the first storage unit 331 is sent to the control content specification unit 31 from the resemblance degree determination unit 70 and the presented heating control content is cancelled by the cancel button 8, a deletion unit 35 of the storage control unit 33 deletes a corresponding combination of the heating control content and the feature quantity of a still image from the correspondence table of the first storage unit 331. Cancelling the presented heating control content means that the heating control content stored in the first storage unit 331 as heating control content of food used frequently by the user has been mistaken. Therefore, in order to not repeat the same mistake next time, the deletion unit 35 deletes the corresponding combination of the heating control content and the feature quantity of the still image from the correspondence table of the first storage unit 331.

Even in the case where the cancel button 8 has been pressed by the user to stop the heating operation during heating, the deletion unit 35 deletes the corresponding combination of the heating control content and the feature quantity of the still image from the correspondence table of the first storage unit 331 in a similar manner to the above. The user pressing the cancel button 8 to stop the heating operation during heating means that the user has recognized a mistake in the heating control content and cancelled during heating. Therefore, in order to not repeat the same mistake next time in a similar manner to the above, the deletion unit 35 deletes the corresponding combination of the heating control content and the feature quantity of the still image from the correspondence table of the first storage unit 331.

In this Embodiment 2, a method of calculating a feature quantity from a still image is the same as in Embodiment 1, and therefore description is omitted.

Next, using a screen displayed in the liquid crystal touch panel 10, the flow of operation of the convection microwave oven 1 in Embodiment 2 will be described. The basic menu screen in Embodiment 2 is the same as the basic menu screen in Embodiment 1 shown in FIG. 6. The basic menu screen is a screen displayed first after power-on or the like. In the basic menu screen, the heat-up button 36, the microwave button 37, the steam button 38, the oven button 39, the grill button 40, and the automatic menu button 41 are displayed.

At the time of first use, the second storage unit 32 does not store anything, since a chamber interior image has not been taken even once by the imaging unit 21. A user opens the door 3 of the convection microwave oven 1, puts food in, and closes the door 3. Since the door being closed is detected by the door switch 22 at that time, the imaging unit 21 acquires a chamber interior image as a still image. The feature quantity calculation unit 26 calculates a histogram (feature quantity) of the acquired still image and stores the histogram in the second storage unit 32.

The user presses one of the buttons in the basic menu screen in FIG. 6 to specify heating control content. For example, in the case where cold rice served in a bowl is put in the heating chamber 11 of the convection microwave oven 1 to be heated, the user presses the heat-up button 36 in FIG. 6. At that time, the presentation control unit 24C switches the basic menu screen of the liquid crystal touch panel 10 to a temperature setting screen of setting the finishing temperature.

The temperature setting screen in Embodiment 2 is the same as the temperature setting screen in Embodiment 1 shown in FIG. 7. In the middle of the temperature setting screen, the setting temperature is displayed. To the right of the setting temperature, the plus button 42 for increasing the setting temperature and the minus button 43 for decreasing the setting temperature are displayed. The setting temperature is settable at 5° C. intervals between 40 to 90° C., for example. The user operates the plus button 42 and the minus button 43 while looking at the setting temperature of the screen to set a desired temperature. When the desired temperature (for example, 70° C.) is set, the user presses the heating start button 7 to start heating.

At this time, the second storage unit 32 stores the histogram of the still image that has been acquired when the door has been closed and stored earlier and heating control content of "heat-up" and "70° C." set by the user in the correspondence table in association with each other. The heating control unit 19 drives the magnetron 12 to heat the cold rice that is food up to 70° C. while monitoring the output of detection by the infrared sensor 18.

In FIG. 7, the microwave button 37, the steam button 38, the oven button 39, the grill button 40, and the automatic menu button 41 having similar functions as in FIG. 6 are displayed as tab buttons in the upper portion of the temperature setting screen. Therefore, a change can be made from the temperature setting screen to a screen for setting other heating control content.

Next, a case of heating shumai that is frozen food, for example, will be described. In the case of heating frozen food that is commonly sold, heating with setting content as indicated in the packaging of the frozen food is recommended, rather than heating using a sensor included in the convection microwave oven 1. A user arranges and wraps a plurality of shumai on a plate, closes the door 3 upon placement within the heating chamber 11, and presses the microwave button 37 shown in FIG. 6 to perform detailed setting.

A heating power setting screen in Embodiment 2 is the same as the heating power setting screen in Embodiment 1 shown in FIG. 8. The heating power setting screen for a microwave includes the 800 W button 44, the 600 W button 45, the 500 W button 46, the 400 W button 47, the 300 W button 48, and the 150 W button 49 as buttons to select the wattage. The user can select the heating power by pressing one of the buttons. For example, when the 500 W button 46 is pressed, setting of the heating time is accepted in the next screen.

A heating time setting screen in Embodiment 2 is the same as the heating time setting screen in Embodiment 1 shown in FIG. 9. The heating time setting screen for a microwave includes the minute button 50 and the second button 51. By the minute button 50 being pressed, the displayed heating time is increased in units of 1 minute from 0 minutes to 9 minutes. Following 9, it returns to 0. By the second button 51 being pressed, the displayed heating time is increased in units of 10 seconds from 0 seconds to 50 seconds. Following 50, it returns to 0. In this manner, setting of the heating time is accepted, and a heating time of, for example, 2 minutes and 30 seconds is set. The user presses the heating start button 7 to start heating.

At this time, the second storage unit 32 stores a histogram of a still image of shumai that has been acquired when the door has been closed and heating control content of "microwave, 500 W, 2 minutes and 30 seconds" set by the user in the correspondence table in association with each other. The heating control unit 19 drives the magnetron 12 to heat the food at 500 W for 2 minutes and 30 seconds.

Next, a case of baking a cookie, for example, will be described. A cookie is generally baked using an oven. As a method of baking a cookie, there are a method in which dough is put and baked within the preheated heating chamber 11 and a method of baking without preheating. Herein, the method of baking without preheating will be described. When a user prepares cookie dough, the prepared dough is arranged on an oven dish and placed within the heating chamber 11. The user closes the door 3 and presses the oven button 39 shown in FIG. 6 to perform detailed setting.

A temperature setting screen for an oven in Embodiment 2 is the same as the temperature setting screen in Embodiment 1 shown in FIG. 10. In the middle of the temperature setting screen, the setting temperature is displayed. To the right of the setting temperature, the plus button 42 for increasing the setting temperature and the minus button 43 for decreasing the setting temperature are displayed. The setting temperature is settable at 10° C. intervals between 150 to 250° C., for example. The user operates the plus button 42 and the minus button 43 while looking at the setting temperature of the screen to set a desired temperature. For example, when 170° C. is set and the next button 52 is pressed, the presentation control unit 24C switches the screen of the liquid crystal touch panel 10 to a heating time setting screen.

The heating time setting screen for an oven in Embodiment 2 is the same as the heating time setting screen in Embodiment 1 shown in FIG. 11. The heating time setting screen for an oven includes the 10-minute button 53 and the 1-minute button 54. By the 10-minute button 53 being pressed, the displayed heating time is increased in units of 10 minutes from 0 minutes to 90 minutes. Following 90, it returns to 0. By the 1-minute button 54 being pressed, the displayed heating time is increased in units of 1 minute from 0 minutes to 9 minutes. Following 9, it returns to 0. In this manner, setting of the heating time is accepted, and a heating time of, for example, 25 minutes is set. The user presses the heating start button 7 to start heating.

At this time, the second storage unit 32 stores a histogram of a still image of cookie dough that has been acquired when the door has been closed and heating control content of "oven, 170° C., 25 minutes" set by the user in the correspondence table in association with each other. The heating control unit 19 drives the circulation fan 15 and heats the inside of the heating chamber 11 with the convection heater 14. The heating control unit 19 performs heating for 25 minutes while controlling the convection heater 14 such that the temperature detected by the thermistor 17 becomes 170° C.

In addition, when the steam button 38 shown in FIG. 6 has been pressed, setting of the heating time for steam heating is accepted. When the grill button 40 has been pressed, setting of one of both-side grill and one-side grill and setting of the heating time are accepted. Further, when the automatic menu button 41 has been pressed, selection of a desired cooking menu out of a plurality of cooking menus such as "gratin," "hamburger steak," and "chicken teriyaki" is accepted. In either case, the second storage unit 32 stores a histogram of a still image of the inside of the heating chamber 11 that has been acquired when the door has been closed and heating control content set by the user in the correspondence table in association with each other at the point of starting heating.

As described above, the second storage unit 32 stores a histogram of a still image of the inside of the heating chamber 11 that has been acquired when the door has been closed and heating control content set by a user in the correspondence table in association with each other, every time a heating operation is performed by a user. The correspondence table stores combinations of histograms of still images and heating control content corresponding to 100 times, for example. Upon next storage of a combination of a histogram of a still image and heating control content, when the combinations of the histograms of the still images and the heating control content corresponding to 100 times are stored, the oldest combination of a histogram of a still image and heating control content is deleted, and the new combination of the histogram of the still image and the heating control content is stored. The second storage unit 32 consistently stores the newest combinations of histograms of still images and heating control content corresponding to 100 times.

When the second storage unit 32 stores a new combination of a histogram of a still image and heating control content, the resemblance degree determination unit 70 extracts, from within the second storage unit 32, a combination having the same heating control content as the heating control content newly stored in the correspondence table. The resemblance degree determination unit 70 sequentially calculates the resemblance degree of a newly calculated feature quantity and a feature quantity included in the combination extracted from the second storage unit 32 and, if the resemblance degree is greater than or equal to a predetermined resemblance degree, sends the combination of the feature quantity and the heating control content to the registration unit 34. The resemblance degree is represented by the sum of the difference area of two histograms. In the case where the sum of the difference area is less than or equal to a predetermined value, it is determined that the resemblance degree is greater than or equal to the predetermined resemblance degree. The counter 332 of the registration unit 34 calculates the count value representing the number of combinations sent by the resemblance degree determination unit 70. The comparison unit 333 compares whether or not the count value of the counter 332 is greater than or equal to a predetermined value. The comparison unit 333 determines whether or not the count value is greater than or equal to a predetermined number of, for example, 5. In the case where it is determined that the count value is greater than or equal to, for example, 5, the average calculation unit 335 calculates an average value of feature quantities included in all combinations sent by the resemblance degree determination unit 70 and stores the average value and the heating control content in the correspondence table in association with each other.

The operation of the convection microwave oven 1 will be described when food is put within the heating chamber 11 and the door 3 has been closed, in a state where it is determined that there are five or more combinations in which the heating control content is the same and the resemblance degree of feature quantities of still images is greater than or equal to a predetermined value among 100 recently stored combinations of feature quantity and heating control content, the feature quantities of the five or more combinations are averaged, and the averaged feature quantity and the heating control content are stored in the first storage unit 331 in association with each other. For example, assume that cold rice served in a bowl is placed in the heating chamber 11 and the door 3 has been closed, in a state where the correspondence table of the first storage unit 331 stores three types of associations of a histogram and heating control content that are an association of an average value of histograms of still images of cold rice served in a bowl and heating control content of "heat-up, 70° C.," an association of an average value of histograms of still images of shumai arranged on a plate and heating control content of "microwave, 500 W, 2 minutes and 30 seconds," and an association of an average value of histograms of still images of cookies arranged on an oven dish and heating control content of "oven, 170° C., 25 minutes."

At this time, the feature quantity calculation unit 26 calculates a histogram from a still image taken by the imaging unit 21 when the door has been closed this time. The resemblance degree determination unit 70 calculates the resemblance degree of the three types of histograms stored in the first storage unit 331 and the histogram calculated this time. The resemblance degree is the sum of the area of a non-matching portion described with FIG. 5. A smaller area of the non-matching portion of two histograms indicates greater resemblance of the two histograms. With calculation of the resemblance degree, a histogram most resembling the histogram of the still image taken this time is the histogram of the still image of cold rise served in a bowl that is already stored. The reason is that the area of the non-matching portion of the two histograms is the smallest, since similar food is imaged in the still images.

The resemblance degree determination unit 70 sends "heat-up, 70° C." that is heating control content stored in the first storage unit 331 in association with the histogram (average value) of the still image of cold rice served in a bowl to the control content specification unit 31 as heating control content for this time. The presentation unit (color liquid crystal panel) 24 displays the temperature setting screen in FIG. 7. That is, a screen of a state where an input operation of temperature has ended in the temperature setting screen in FIG. 7 is displayed, without the basic menu screen in FIG. 6 being displayed first. The user presses the heating start button 7 if the presented heating control content is not mistaken. When the heating start button 7 is pressed, the heating control unit 19 drives the magnetron 12 to heat the cold rice that is food up to 70° C. while monitoring the output of detection by the infrared sensor 18. The user can order a desired heating operation merely by pressing the heating start button 7 while omitting all operations of inputting heating control content during the procedure. A troublesome operation can be omitted.

Figure 15:
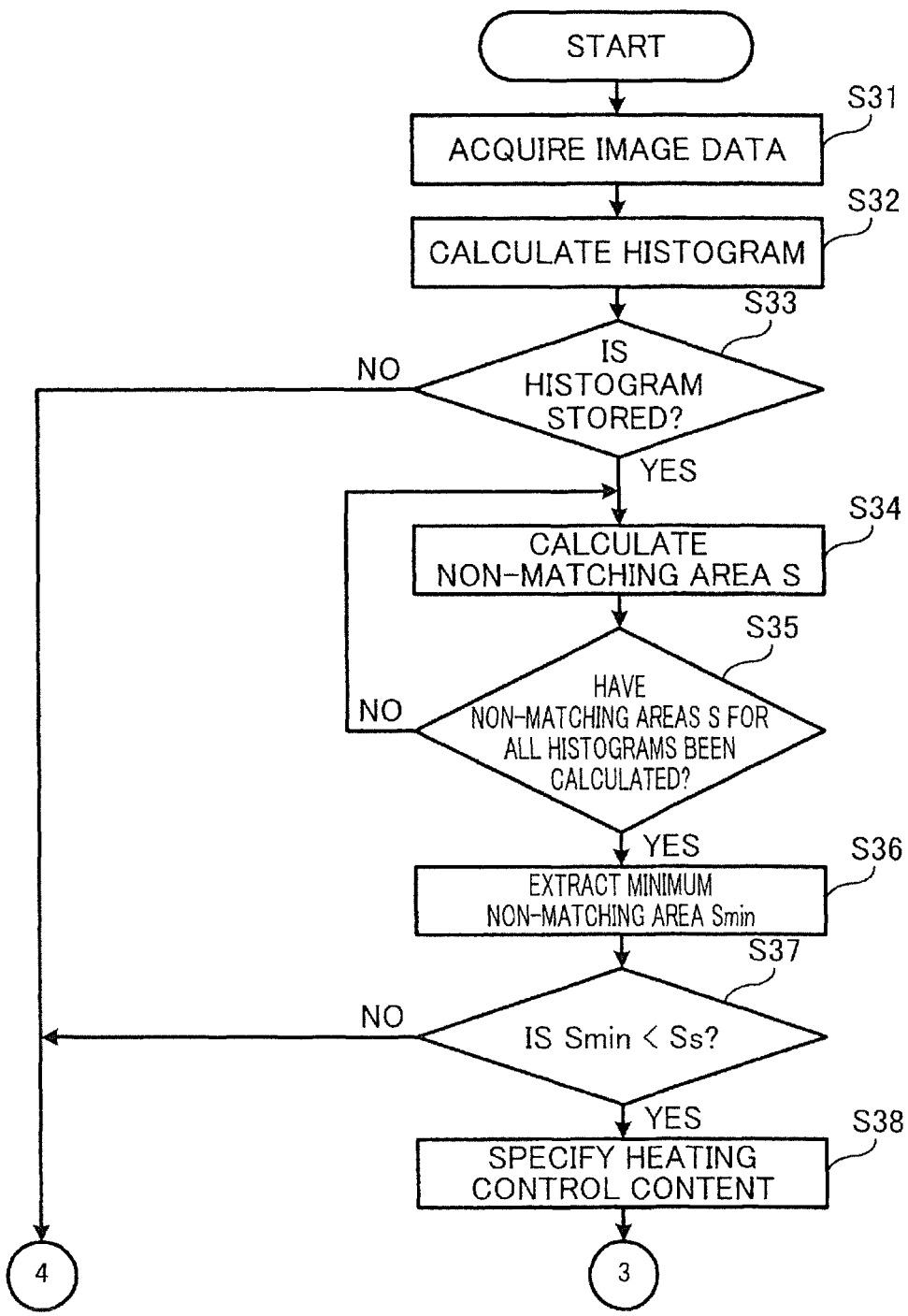
FIG. 15 is a first flowchart for illustrating the overall flow of operation of the convection microwave oven in Embodiment 2.
Figure 16:
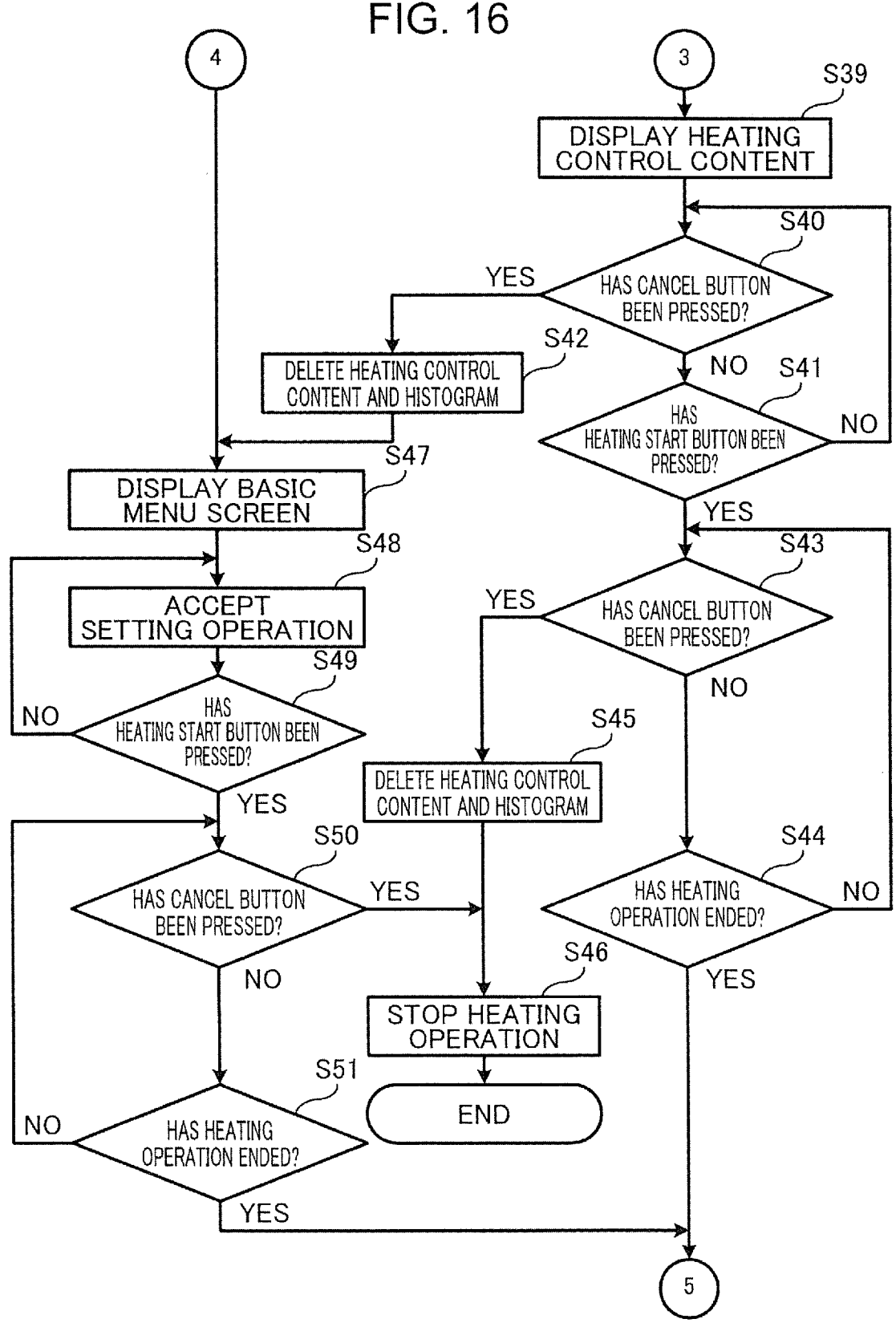
FIG. 16 is a second flowchart for illustrating the overall flow of operation of the convection microwave oven in Embodiment 2.
Figure 17:
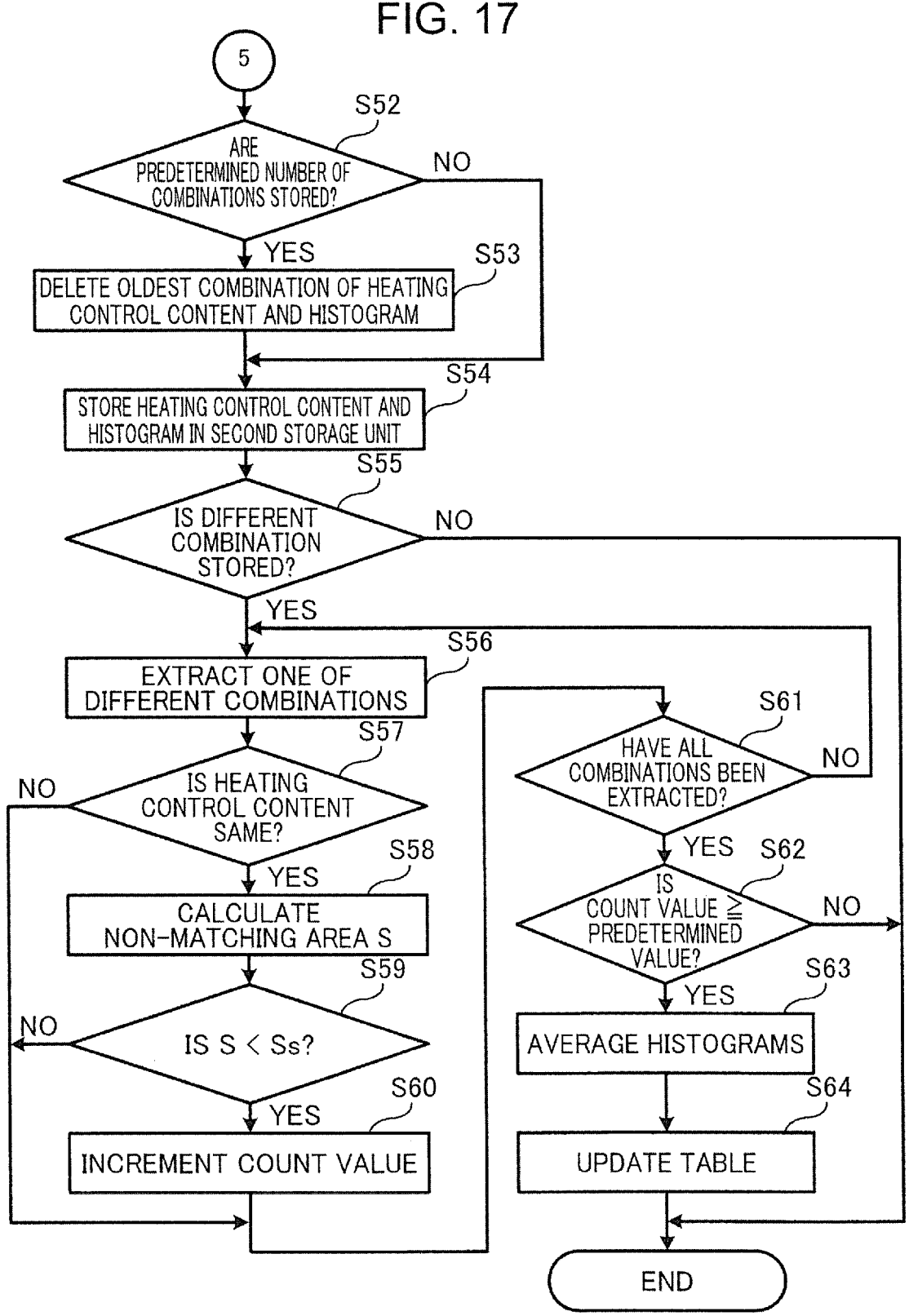
FIG. 17 is a third flowchart for illustrating the overall flow of operation of the convection microwave oven in Embodiment 2.

Next, using a flowchart in FIG. 15 to FIG. 17, the overall flow of operation of the convection microwave oven 1 in Embodiment 2 will be described. FIG. 15 is a first flowchart for illustrating the overall flow of operation of the convection microwave oven in Embodiment 2. FIG. 16 is a second flowchart for illustrating the overall flow of operation of the convection microwave oven in Embodiment 2. FIG. 17 is a third flowchart for illustrating the overall flow of operation of the convection microwave oven in Embodiment 2. Herein, the flow of operation from detection by the door switch 22 that the door 3 has been closed after the door 3 has been opened and food has been housed within the heating chamber 11 will be described.

When the door switch 22 detects that the door 3 has been closed, the imaging unit 21 images the food housed within the heating chamber 11 to acquire image data (still image) in step S31.

Next, in step S32, the feature quantity calculation unit 26 calculates a histogram shown in FIG. 4 from the acquired image data.

Next, in step S33, the registration unit 34 determines whether or not a histogram is stored in the first storage unit 331. In the case where it is determined that a histogram is stored in the first storage unit 331 (YES in step S33), it proceeds to the process in step S34. In the case where it is determined that a histogram is not stored in the first storage unit 331 (NO in step S33), it proceeds to the process in step S47.

Next, in step S34, the resemblance degree determination unit 70 calculates the non-matching area S of the histogram stored in the first storage unit 331 and the histogram calculated in step S32. The non-matching area S is an area of a hatching portion described with FIG. 5 and is a difference area of the two histograms. It can be said that a smaller non-matching area S indicates greater resemblance of the two histograms, i.e., greater resemblance of two still images from which the histograms have originated.

Next, in step S35, the resemblance degree determination unit 70 determines whether or not the non-matching areas S for all histograms stored in the first storage unit 331 have been calculated. In the case where it is determined that the non-matching areas S for all histograms have not been calculated (NO in step S35), it returns to the process in step S34, and the resemblance degree determination unit 70 calculates the non-matching areas S of different histogram stored in the first storage unit 331 and the histogram calculated in step S32. In the case where n histograms are stored in the first storage unit 331, n non-matching areas S are calculated.

In the case where it is determined that the non-matching areas S for all histograms have been calculated (YES in step S35), the resemblance degree determination unit 70 extracts the minimum non-matching area Smin that is the smallest area out of all of the (n) calculated non-matching areas S in step S36.

Next, in step S37, the resemblance degree determination unit 70 determines whether or not the extracted minimum non-matching area Smin is smaller than the predetermined area Ss. This process is a process for determining whether or not there is at least a certain degree of resemblance in the most resembling histogram. If the most resembling histogram is not a histogram with at least a certain degree of resemblance, it is likely that food is different. Therefore, it is determined that a histogram of image data of the food housed in the heating chamber 11 is not stored in the first storage unit 331. In the case where it is determined that the minimum non-matching area Smin is smaller than the predetermined area Ss in step S37 (YES in step S37), it proceeds to the process in step S38. In the case where it is determined that the minimum non-matching area Smin is not smaller than the predetermined area Ss, i.e., in the case where it is determined that the minimum non-matching area Smin is greater than or equal to the predetermined area Ss (NO in step S37), it proceeds to the process in step S47.

Next, in step S38, the control content specification unit 31 specifies heating control content stored in association with the histogram used upon calculating the non-matching area S extracted as the minimum non-matching area Smin. The resemblance degree determination unit 70 sends the heating control content stored in association with the histogram used upon calculating the non-matching area S extracted as the minimum non-matching area Smin to the control content specification unit 31.

Next, in step S39, the presentation unit 24 displays the heating control content specified by the control content specification unit 31. The heating control content is, for example, "heat-up, 70° C.," "microwave, 500 W, 2 minutes and 30 seconds," or "oven, 170° C., 25 minutes." The heating control content is constituted by, for example, a heating method, heating power, heating temperature, and heating time. A screen displayed by the presentation unit 24 is, for example, the screen shown in FIG. 7, FIG. 9, or FIG. 11.

Next, in step S40, the setting unit 25 determines whether or not the cancel button 8 has been pressed by a user. In the case where it is determined that the cancel button 8 has not been pressed (NO in step S40), the setting unit 25 determines whether or not the heating start button 7 has been pressed in step S41.

In the case where it is determined that the heating start button 7 has not been pressed (NO in step S41), it returns to the process in step S40. A cancel operation of the user is accepted in step S40, until it is determined that the heating start button 7 has been pressed in step S41. The cancel operation of the user is an operation of pressing the cancel button 8, in the case where the heating control content displayed in step S39 is different from that desired by the user.

In the case where it is determined that the heating start button 7 has been pressed without the cancel button 8 being pressed (YES in step S41), the heating control unit 19 starts heating and proceeds to the process in step S43.

In the case where it is determined that the cancel button 8 has been pressed by the user (YES in step S40), the deletion unit 334 deletes the heating control content displayed in step S39 and the histogram associated with the heating control content from the first storage unit 331 in step S42 and proceeds to the process in step S47.

In step S43, the heating control unit 19 determines whether or not the cancel button 8 has been pressed by the user. In the case where it is determined that the cancel button 8 has not been pressed (NO in step S43), the heating control unit 19 determines whether or not a heating operation has ended in step S44. In the case where it is determined that the heating operation has not ended (NO in step S44), the heating control unit 19 returns to the process in step S43 and determines whether or not the cancel button 8 has been pressed by the user. The heating control unit 19 continues to check whether or not the cancel button 8 has been pressed by the user, until it is determined that the heating operation has ended in step S44.

In the case where it is determined by a timer that a predetermined time has passed without the cancel button 8 being pressed, or in the case where it is determined by the infrared sensor 18 that a predetermined temperature has been reached, the heating control unit 19 ends the heating operation and proceeds to the process in step S52. That is, in the case where it is determined that the heating operation has ended (YES in step S44), it proceeds to the process in step S52. The processes in step S52 and thereafter will be described using FIG. 17.

In the case where it is determined that the cancel button 8 has been pressed (YES in step S43), the deletion unit 334 deletes the heating control content displayed in step S39 and the histogram associated with the heating control content from the first storage unit 331 in step S45, in a similar manner to the process in step S42.

Next, in step S46, the heating control unit 19 stops the heating operation and ends the process.

In the case where it is determined that a histogram is not stored in the first storage unit 331 in step S33, in the case where it is determined that the minimum non-matching area Smin is not smaller than the predetermined area Ss in step S37, or in the case where heating control content and a histogram are deleted from the first storage unit 331 in step S42, the presentation control unit 24C controls the presentation unit 24 to display the basic menu screen shown in FIG. 6 that is a default starting screen, and the presentation unit 24 displays the basic menu screen in step S47.

Next, in step S48, the setting unit 25 accepts a setting operation relating to heating control content by the user.

Next, in step S49, the heating control unit 19 determines whether or not the heating start button 7 has been pressed. The setting unit 25 accepts the setting operation of the user in step S48, until it is determined that the heating start button 7 has been pressed in step S49. That is, in the case where it is determined that the heating start button 7 has not been pressed (NO in step S49), it returns to the process in step S48. The setting operation of the user includes a setting operation in a screen displayed following pressing of one of the buttons in the basic menu screen shown in FIG. 6 and is an operation up to confirmation of the heating control content. In the case where it is determined that the heating start button 7 has been pressed by the heating control unit 19 (YES in step S49), it proceeds to the process in step S50.

Next, in step S50, the heating control unit 19 determines whether or not the cancel button 8 has been pressed. In the case where it is determined that the cancel button 8 has not been pressed (NO in step S50), the heating control unit 19 determines whether or not a heating operation has ended in step S51. In the case where it is determined that the heating operation has not ended (NO in step S51), it returns to the process in step S50, and whether or not the cancel button 8 has been pressed by the user is determined. That is, the heating control unit 19 continues to check whether or not the cancel button 8 has been pressed by the user, until it is determined that the heating operation has ended in step S51.

In the case where it is determined that the cancel button 8 has been pressed (YES in step S50), the heating control unit 19 stops the heating operation and ends the process in step S46.

In the case where it is determined that the heating operation has ended (YES in step S51), it proceeds to the process in step S52. That is, in the case where it is determined that the time measured by a timer has passed by a predetermined time without the cancel button 8 being pressed, or in the case where it is determined that the temperature measured by the infrared sensor 18 has reached a predetermined temperature, the heating control unit 19 ends the heating operation and proceeds to the process in step S52.

Next, using the flowchart in FIG. 17, the flow of storage operation for the second storage unit 32 and storage operation for the first storage unit 331 will be described.

In the case where the heating operation has ended in step S44 or step S51 without the cancel button 8 being pressed by the user in step S43 or step S50 during heating in FIG. 16, the processes in step S52 and thereafter in FIG. 17 are performed.

In step S52, the resemblance degree determination unit 70 determines whether or not the second storage unit 32 stores a predetermined number of (for example, 100) combinations of a histogram and heating control content. In the case where it is determined that the predetermined number of combinations of a histogram and heating control content are not stored (NO in step S52), it proceeds to the process in step S54. In the case where it is determined that the predetermined number of combinations of a histogram and heating control content are stored (YES in step S52), the resemblance degree determination unit 70 deletes the oldest combination of a histogram and heating control content that is stored in the second storage unit 32 in step S53.

Next, in step S54, the resemblance degree determination unit 70 stores the heating control content specified in step S38 or the heating control content set in step S48 in the second storage unit 32 in association with the histogram calculated in step S32.

Next, in step S55, the resemblance degree determination unit 70 determines whether or not a different combination of heating control content and histogram is stored in the second storage unit 32, aside from the combination of the heating control content and the histogram stored in step S54. In the case where it is determined that a different combination of heating control content and histogram is stored in the second storage unit 32 (YES in step S55), it proceeds to the process in step S56. In the case where it is determined that a different combination of heating control content and histogram is not stored in the second storage unit 32 (NO in step S55), the process is ended. A different combination of heating control content and histogram not being stored in the second storage unit 32 indicates that the heating operation for this time has been the first use of the convection microwave oven. Since a histogram of the past to be compared with the histogram calculated this time is absent, the process is ended.

Next, in step S56, the resemblance degree determination unit 70 extracts one of the different combinations of heating control content and histogram that are stored in the second storage unit 32. In the case where m different combinations are stored in the second storage unit 32, the processes in steps S57 to S60 are sequentially repeated with respect to the respective different combinations.

Next, in step S57, the resemblance degree determination unit 70 determines whether or not the heating control content of the extracted different combination of heating control content and histogram is the same as the heating control content specified this time. In the case where it is determined that the heating control content of the different combination is the same as the heating control content specified this time (YES in step S57), it proceeds to the process in step S58. In the case where it is determined that the heating control content of the different combination is not the same as the heating control content specified this time (NO in step S57), it proceeds to the process in step S61.

Next, in step S58, the resemblance degree determination unit 70 calculates the non-matching area S of the histogram associated with the heating control content of the different combination and the histogram calculated in step S32. The non-matching area S is an area of a hatching portion described with FIG. 5 and is a difference area of the two histograms. A smaller non-matching area S indicates greater resemblance of the two histograms.

Next, in step S59, the resemblance degree determination unit 70 determines whether or not the calculated non-matching area S is smaller than the predetermined area Ss. In the case where it is determined that the calculated non-matching area S is smaller than the predetermined area Ss (YES in step S59), it proceeds to the process in step S60. In the case where it is determined that the calculated non-matching area S is not smaller than the predetermined area Ss, i.e., in the case where it is determined that the non-matching area S is greater than or equal to the predetermined area Ss (NO in step S59), it proceeds to the process in step S61.

Next, in step S60, the counter 332 of the registration unit 34 increments the count value showing the number of different combinations with the same heating control content and resembling histograms. The resemblance degree determination unit 70 sends to the registration unit 34 the combination of the histogram and the heating control content for which the non-matching area S has been determined to be smaller than the predetermined area Ss.

Next, in step S61, the resemblance degree determination unit 70 determines whether or not all of the different combinations stored in the second storage unit 32 have been extracted. In the case where it is determined that all of the different combinations have not been extracted (NO in step S61), it returns to the process in step S56, and the resemblance degree determination unit 70 extracts one that is not yet extracted out of the different combinations of heating control content and histogram. The processes in step S56 to S61 are performed with respect to all of the m different combinations of heating control content and histogram that are stored in the second storage unit 32.

In the case where it is determined that the all of the different combinations have been extracted (YES in step S61), the comparison unit 333 determines whether or not the count value of the counter 332 is greater than or equal to a predetermined value in step S62. The predetermined value is, for example, 5. In the case where it is determined that the count value is greater than or equal to the predetermined value (YES in step S62), it proceeds to the process in step S63. In the case where it is determined that the count value is not greater than or equal to the predetermined value, i.e., in the case where it is determined that the count value is less than the predetermined value (NO in step S62), the process is ended.

The count value being greater than or equal to the predetermined value indicates that, within the correspondence table stored in the second storage unit 32, there are a predetermined number of or more combinations of heating control content and histogram in which the heating control content is the same as the heating control content specified this time and the non-matching area of histograms is smaller than the predetermined area. That is, it means that the same food has been heated with the same heating control content a predetermined number of times or more among the recent predetermined number of heating operations stored in the second storage unit 32, meaning that the frequency of the same food being heated with the same heating control content is high. Such heating control content with a high usage frequency is stored in the correspondence table of the first storage unit 331.

Next, in step S63, the average calculation unit 335 averages a plurality of histograms out of a plurality of combinations with the same heating control content and resembling histograms.

Next, in step S64, the average calculation unit 335 updates the correspondence table within the first storage unit 331 such that the averaged histogram and the specified heating control content are associated with each other.

In this Embodiment 2, it shifts to the process in step S52 in the case where it is determined that the heating operation has ended in step S44. However, the present invention not particularly limited as such, and the process may be ended in the case where it is determined that the heating operation has ended in step S44.

Embodiment 3

Next, a cooking system according to Embodiment 3 of this disclosure will be described.

The external appearance of a convection microwave oven in Embodiment 3 is the same as the external appearance of the convection microwave oven in Embodiment 1 shown in FIG. 1, and therefore description is omitted. The schematic configuration of the convection microwave oven in Embodiment 3 is the same as the schematic configuration of the convection microwave oven in Embodiment 1 shown in FIG. 2, and therefore description is omitted.

Figure 18:
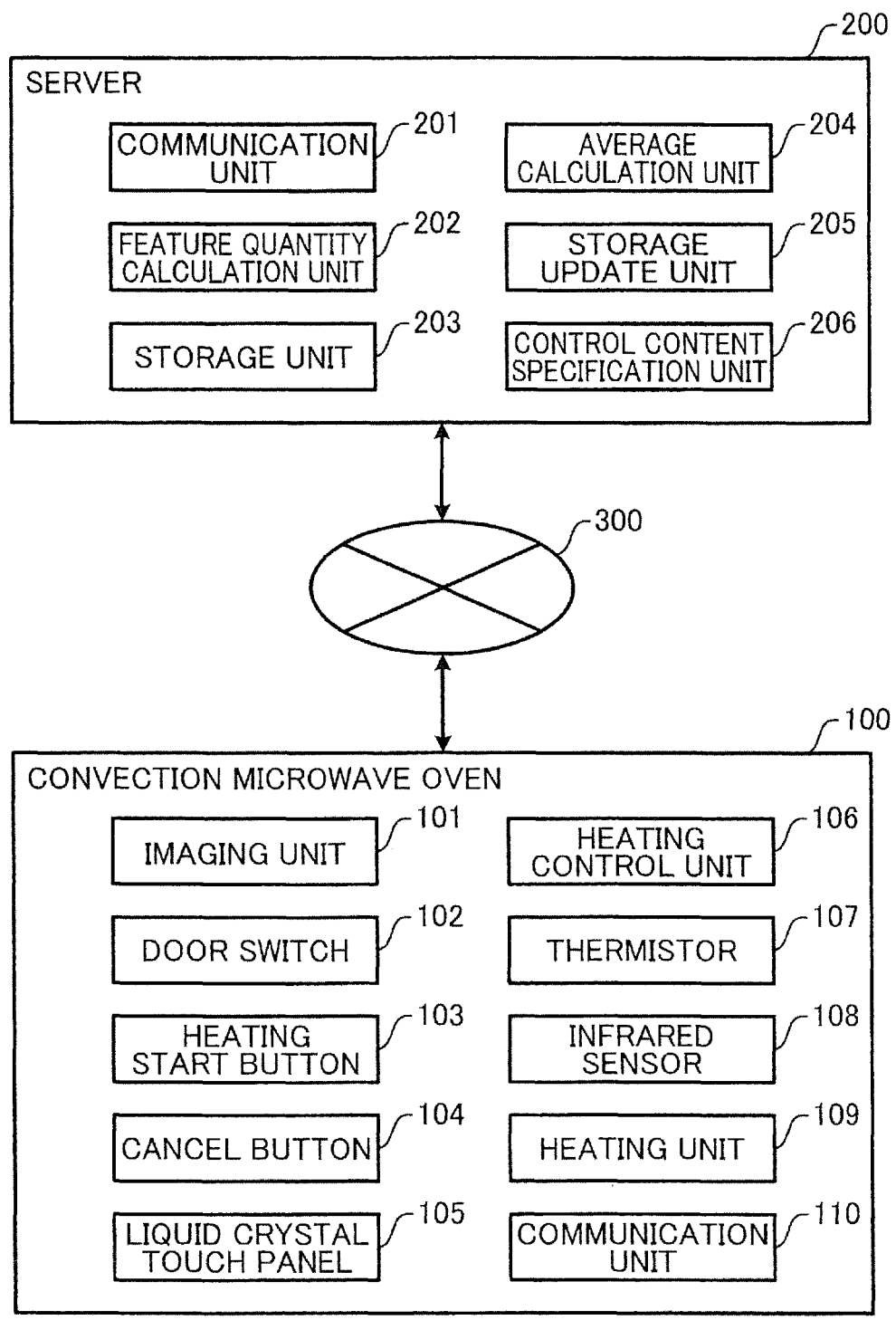
FIG. 18 is a diagram showing the schematic configuration of a cooking system according to Embodiment 3 of the present invention.

FIG. 18 is a diagram showing the schematic configuration of the cooking system according to Embodiment 3 of the present invention.

The cooking system shown in FIG. 18 includes a convection microwave oven 100 and a server 200. The convection microwave oven 100 is connected to be capable of communication with the server 200 via a network 300. The network 300 is, for example, the Internet.

The convection microwave oven 100 includes an imaging unit 101, a door switch 102, a heating start button 103, a cancel button 104, a liquid crystal touch panel 105, a heating control unit 106, a thermistor 107, an infrared sensor 108, a heating unit 109, and a communication unit 110.

The imaging unit 101, the door switch 102, the heating start button 103, the cancel button 104, the liquid crystal touch panel 105, the thermistor 107, and the infrared sensor 108 respectively have the same functions as the imaging unit 21, the door switch 22, the heating start button 7, the cancel button 8, the liquid crystal touch panel 10, the thermistor 17, and the infrared sensor 18 shown in FIG. 3.

The heating unit 109 includes the magnetron 12, the flat heater 13, the convection heater 14, and the steam generator 16 shown in FIG. 3.

The communication unit 110 transmits image data acquired by the imaging unit 101 to the server 200 and receives heating control content specified in accordance with image data from the server 200. The liquid crystal touch panel 105 presents heating control content received by the communication unit 110.

The communication unit 110 receives a negative storage signal showing that heating control content corresponding to transmitted image data is not stored in the server 200. In the case where a negative storage signal has been received, the liquid crystal touch panel 105 displays a basic menu screen and accepts a user input of heating control content.

When the liquid crystal touch panel 105 accepts a user input and then the heating start button 7 orders the start of heating operation, the communication unit 110 transmits image data acquired by the imaging unit 101 and heating control content input by the liquid crystal touch panel 105 to the server 200.

The server 200 includes a communication unit 201, a feature quantity calculation unit 202, a storage unit 203, an average calculation unit 204, a storage update unit 205, and a control content specification unit 206.

The communication unit 201 receives image data transmitted by the convection microwave oven 100. The communication unit 201 receives heating control content transmitted by the convection microwave oven 100. The communication unit 201 transmits heating control content associated with received image data to the convection microwave oven 100. Further, in the case where heating control content associated with received image data is not stored in the storage unit 203, the communication unit 201 transmits a negative storage signal showing that heating control content corresponding to the image data is not stored in the server 200 to the convection microwave oven 100.

The feature quantity calculation unit 202, the storage unit 203, the average calculation unit 204, the storage update unit 205, and the control content specification unit 206 have the same functions as the feature quantity calculation unit 26, the storage unit 27, the average calculation unit 30, the storage update unit 29, and the control content specification unit 28 shown in FIG. 3.

It may be such that the server 200 does not include the feature quantity calculation unit 202, and the convection microwave oven 100 includes the feature quantity calculation unit 202. In this case, the communication unit 110 of the convection microwave oven 100 may transmit a feature quantity (histogram) calculated by the feature quantity calculation unit 202 to the server 200.

In the cooking system in Embodiment 3, the convection microwave oven 100 performs the processes in steps S1, S9 to S14, and S16 to S20 shown in FIGS. 12 and 13, and the server 200 performs the processes in steps S2 to S8, S15, and S21 shown in FIGS. 12 and 13.

In Embodiment 3, the storage unit 27 may store a correspondence table for every user. In this case, the convection microwave oven 100 transmits image data and heating control content together with a user ID for identification of a user, and the server 200 stores the image data and the heating control content in the correspondence table corresponding to the user ID.

In Embodiment 3, the storage unit 27 may store a correspondence table for every convection microwave oven. In this case, the convection microwave oven 100 transmits image data and heating control content together with an equipment ID for identification of the convection microwave oven, and the server 200 stores the image data and the heating control content in the correspondence table corresponding to the equipment ID.

Further, in Embodiment 3, the storage unit 27 may store one correspondence table. In this case, the server 200 stores image data and heating control content transmitted from a plurality of the convection microwave ovens 100 in one correspondence table. Accordingly, more combinations of image data and heating control content can be acquired, and heating control content suited for various food can be presented to a user.

Embodiment 4

Next, a cooking system according to Embodiment 4 of this disclosure will be described.

The external appearance of a convection microwave oven in Embodiment 4 is the same as the external appearance of the convection microwave oven in Embodiment 1 shown in FIG. 1, and therefore description is omitted. The schematic configuration of the convection microwave oven in Embodiment 4 is the same as the schematic configuration of the convection microwave oven in Embodiment 1 shown in FIG. 2, and therefore description is omitted.

Figure 19:
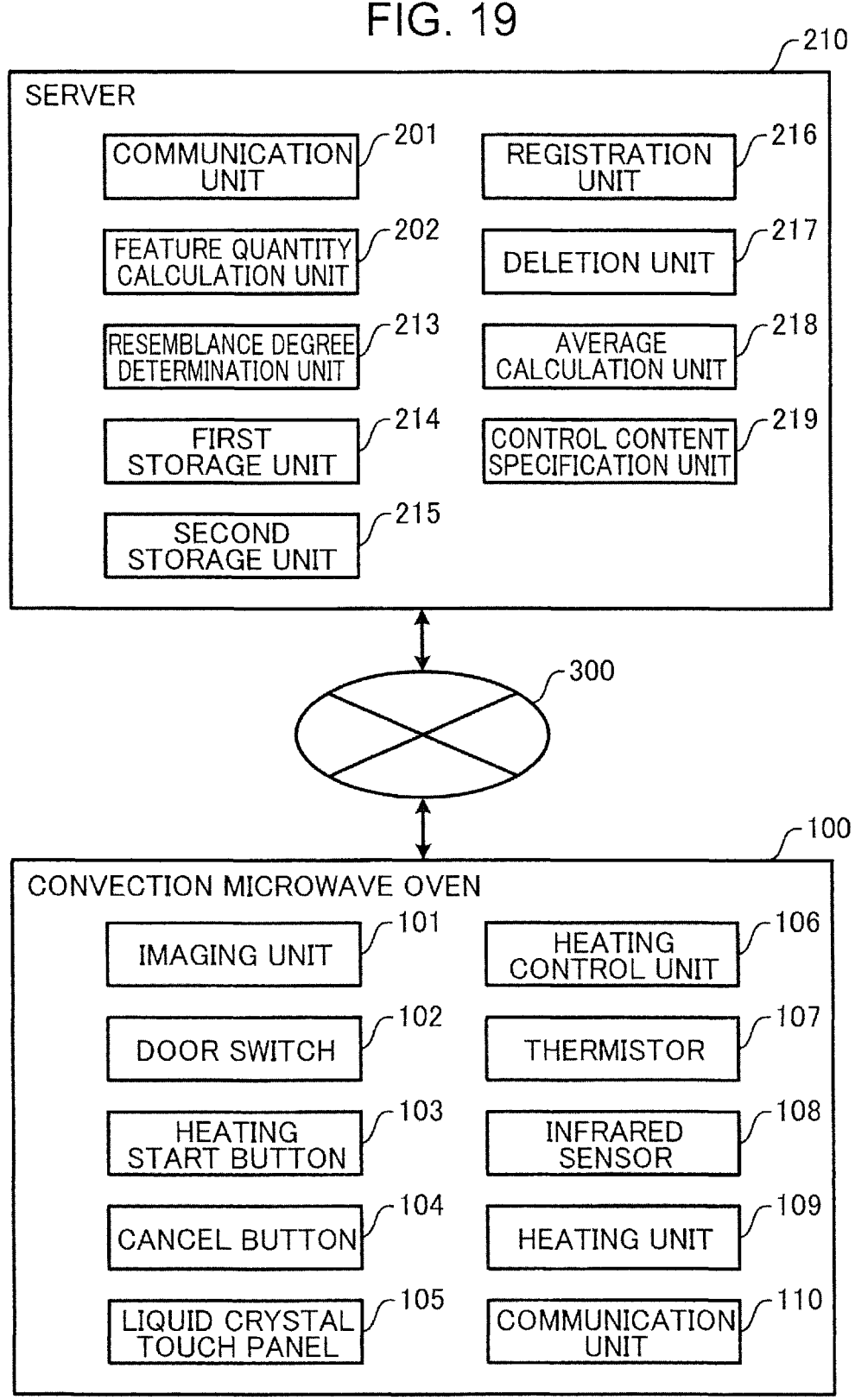
FIG. 19 is a diagram showing the schematic configuration of a cooking system according to Embodiment 4 of the present invention.

FIG. 19 is a diagram showing the schematic configuration of the cooking system according to Embodiment 4 of the present invention.

The cooking system shown in FIG. 19 includes the convection microwave oven 100 and a server 210. The convection microwave oven 100 is connected to be capable of communication with the server 210 via the network 300. The network 300 is, for example, the Internet.

In the cooking system according to this Embodiment 4, the same reference numeral is assigned and description is omitted for the same configuration as in Embodiment 3.

The server 210 includes the communication unit 201, the feature quantity calculation unit 202, a resemblance degree determination unit 213, a first storage unit 214, a second storage unit 215, a registration unit 216, a deletion unit 217, an average calculation unit 218, and a control content specification unit 219.

The resemblance degree determination unit 213, the first storage unit 214, the second storage unit 215, the registration unit 216, the deletion unit 217, the average calculation unit 218, and the control content specification unit 219 respectively have the same functions as the resemblance degree determination unit 70, the first storage unit 331, the second storage unit 32, the registration unit 34, the deletion unit 334, the average calculation unit 335, and the control content specification unit 31 shown in FIG. 14.

It may be such that the server 210 does not include the feature quantity calculation unit 202, and the convection microwave oven 100 includes the feature quantity calculation unit 202. In this case, the communication unit 110 of the convection microwave oven 100 may transmit a feature quantity (histogram) calculated by the feature quantity calculation unit 202 to the server 210.

In the cooking system in Embodiment 4, the convection microwave oven 100 performs the processes in steps S31, S39 to S41, S43, S44, and S46 to S51 shown in FIGS. 15 to 17, and the server 200 performs the processes in steps S32 to S38, S42, S45, and S52 to S64 shown in FIGS. 15 to 17.

In the case where it is determined that the cancel button 8 has been pressed in step S40, the communication unit 110 of the convection microwave oven 100 transmits a signal showing that the cancel button 8 has been pressed to the server 200. Upon receiving the signal, the deletion unit 217 of the server 200 deletes heating control content transmitted to the convection microwave oven 100 and a histogram associated with the heating control content from the first storage unit 214.

In the case where it is determined that the cancel button 8 has been pressed in step S43, the communication unit 110 of the convection microwave oven 100 transmits a signal showing that the cancel button 8 has been pressed to the server 200. Upon receiving the signal, the deletion unit 217 of the server 200 deletes heating control content transmitted to the convection microwave oven 100 and a histogram associated with the heating control content from the first storage unit 214.

The specific embodiments described above mainly include an invention having the following configurations.

A heating cooker according to one aspect of the present invention includes: a heating chamber that houses food; a heating unit that heats the food in the heating chamber; an image data acquisition unit that acquires image data on the food after the food has been housed in the heating chamber; an acceptance unit that accepts a user input relating to heating control content defining a heating operation of the heating unit; a first storage unit that stores control information in which the image data and the heating control content corresponding to the food specified from the image data are associated with each other; a start order unit that orders start of the heating operation to the heating unit; and an update unit that associates the image data and the heating control content with each other and updates the control information within the first storage unit, when the acceptance unit accepts the user input and then the start order unit orders start of the heating operation.

With this configuration, the image data of the food is acquired after the food has been housed in the heating chamber, the user input relating to the heating control content defining the heating operation of the heating unit is accepted, and the start of the heating operation is ordered to the heating unit. When the user input is accepted and then the start of the heating operation is ordered, the image data and the heating control content are associated with each other, and the control information within the first storage unit is updated.

Thus, merely by the user input of the heating control content being accepted and the start of the heating operation being ordered, the image data of the food and the heating control content can be stored automatically in the storage unit in association with each other. Therefore, work of registering the image data and the heating control content can be performed without particular intention by a user, and convenience for the user can be improved.

In the heating cooker described above, it is preferable that a specification unit that specifies the heating control content associated with resembling image data resembling the image data acquired by the image data acquisition unit, based on the control information stored in the first storage unit, and a presentation unit that presents the heating control content specified by the specification unit be further included, and the start order unit order start of the heating operation defined by the heating control content presented by the presentation unit.

With s configuration, the heating control content associated with the resembling image data resembling the acquired image data is specified based on the control information stored in the first storage unit. The specified heating control content is presented, and the start of the heating operation defined by the presented heating control content is ordered.

Thus, a user can start a desired heating operation merely by ordering the start of the heating operation while omitting all operations of inputting heating control content during the procedure. A troublesome operation of inputting heating control content can be omitted.

In the heating cooker described above, it is preferable that the specification unit determine whether or not the resembling image data is stored in the first storage unit to specify the heating control content associated with the resembling image data, based on the control information stored in the first storage unit in a case where the resembling image data is determined to be stored in the first storage unit, and the acceptance unit accept the user input in a case where the specification unit has determined that the resembling image data is not stored in the first storage unit.

With this configuration, whether or not the resembling image data is stored in the first storage unit is determined. In the case where it is determined that the resembling image data is stored in the first storage unit, the heating control content associated with the resembling image data is specified based on the control information stored in the first storage unit. In the case where it is determined that the resembling image data is not stored in the first storage unit, the user input is accepted.

Thus, in the case where food that has not been heated before has been housed, a user can be prompted to input heating control content for the food. In the case where food that has been heated before has been housed, heating control content that is already stored can be presented to omit an input operation of the user.

In the heating cooker described above, it is preferable that a stop order unit that orders stoppage of heating operation to the heating unit after start of the heating operation defined by the heating control content presented by the presentation unit has been ordered by the start order unit be further included, and the update unit delete from the first storage unit the heating control content presented by the presentation unit and the image data associated with the heating control content in a case where stoppage of heating operation has been ordered by the stop order unit.

With this configuration, the presented heating control content and the image data associated with the heating control content are deleted from the first storage unit, in the case where the stoppage of heating operation has been ordered after the start of the heating operation defined by the presented heating control content has been ordered.

Thus, in the case where the stoppage of heating operation has been ordered after the start of the heating operation defined by the presented heating control content has been ordered, it can be determined that a user has recognized a mistake in the presented heating control content and stopped the heating operation. In this case, the presented heating control content and the image data associated with the heating control content are deleted from the first storage unit. Therefore, an erroneous combination of image data and heating control content can be prevented from being stored.

It is preferable that the heating cooker described above further include an image averaging processing unit that calculates average image data in which the image data acquired by the image data acquisition unit and the resembling image data stored in the first storage unit are averaged and that stores the average image data in the first storage unit in association with the heating control content, after start of the heating operation defined by the heating control content presented by the presentation unit has been ordered by the start order unit.

With this configuration, the average image data in which the acquired image data and the resembling image data stored in the first storage unit are averaged is calculated, and the calculated average image data is stored in the first storage unit in association with the heating control content, after the start of the heating operation defined by the presented heating control content has been ordered by the start order unit.

Thus, image data with high reliability can be stored while reducing the influence of noise or the like, and the precision in specifying heating control content can be improved.

It is preferable that the heating cooker described above further include: a second storage unit that stores the heating control content and a plurality of types of image data associated with the heating control content; an extraction unit that extracts a plurality of types of resembling image data that resemble each other from the plurality of types of image data; and a registration unit that registers the heating control content and the plurality of types of resembling image data in the first storage unit after associating the heating control content and the plurality of types of resembling image data with each other in a case where an acquisition frequency of the plurality of types of resembling image data exceeds a predetermined value.

With this configuration, the second storage unit stores the heating control content and the plurality of types of image data associated with the heating control content. In the case where the plurality of types of resembling image data that resemble each other are extracted from the plurality of types of image data, and the acquisition frequency of the plurality of types of resembling image data exceeds the predetermined value, the heating control content and the plurality of types of resembling image data are registered in the first storage unit in association with each other.

Thus, instead of storing all image data and heating control content in the first storage unit, image data and heating control content relating to food with a high frequency of use by a user can be stored in the first storage unit, and the storage capacity of the first storage unit can be reduced.

In the heating cooker described above, it is preferable that the registration unit calculate a count value representing the number of the extracted plurality of types of resembling image data and, in a case where the count value exceeds a predetermined value, register the heating control content and the plurality of types of resembling image data in the first storage unit after associating the heating control content and the plurality of types of resembling image data with each other.

With this configuration, the count value representing the number of the extracted plurality of types of resembling image data is calculated. In the case where the count value exceeds the predetermined value, the heating control content and the plurality of types of resembling image data are registered in the first storage unit in association with each other.

Thus, image data and heating control content relating to food with high frequency of use by a user can be stored in the first storage unit.

In the heating cooker described above, it is preferable that a feature quantity calculation unit that calculates a feature quantity of the image data acquired by the image data acquisition unit be further included, and the update unit associate the feature quantity calculated by the feature quantity calculation unit and the heating control content with each other and update the control information within the first storage unit.

With this configuration, the feature quantity of the acquired image data is calculated, the calculated feature quantity and the heating control content are associated with each other, and the control information within the first storage unit is updated.

Thus, since the feature quantity of the image data is stored instead of the image data being stored, the data volume can be reduced, and the storage capacity of the first storage unit can be reduced.

A cooking system according to another aspect of the present invention is a cooking system including: a heating cooker that heats food; and an arithmetic device connected the heating cooker to be able to communicate therewith, the heating cooker including a heating chamber that houses food, a heating unit that heats the food in the heating chamber, an image data acquisition unit that acquires image data on the food after the food has been housed in the heating chamber, an acceptance unit that accepts a user input relating to heating control content defining a heating operation of the heating unit, a start order unit that orders start of the heating operation to the heating unit, and a transmission unit that transmits the image data and the heating control content to the arithmetic device, when the acceptance unit accepts the user input and then the start order unit orders start of the heating operation, and the arithmetic device including a reception unit that receives the image data and the heating control content, a storage unit that stores control information in which the image data and the heating control content corresponding to the food specified from the image data are associated with each other, and an update unit that associates the image data and the heating control content with each other and updates the control information within the storage unit.

With this configuration, in the heating cooker, the image data of the food is acquired after the food has been housed in the heating chamber. When the user input relating to the heating control content defining the heating operation is accepted and then the start of the heating operation is ordered, the image data and the heating control content are transmitted to the arithmetic device. In the arithmetic device, the image data and the heating control content are received, the image data and the heating control content are associated with each other, and the control information within the storage unit is updated.

Thus, merely by the user input of the heating control content being accepted and the start of the heating operation being ordered, the image data of the food and the heating control content can be stored automatically in the storage unit in association with each other. Therefore, work of registering the image data and the heating control content can be performed without particular intention by a user, and convenience for the user can be improved.

An arithmetic device according to another aspect of the present invention is an arithmetic device connected to a heating cooker that heats food to be able to communicate therewith, including: a reception unit that receives image data on the food acquired after the food has been housed in a heating chamber and heating control content defining a heating operation that have been transmitted by the heating cooker; a storage unit that stores control information in which the image data and the heating control content corresponding to the food specified from the image data are associated with each other; and an update unit that associates the image data and the heating control content with each other and updates the control information within the storage unit.

With this configuration, the image data of the food acquired after the food has been housed in the heating chamber and the heating control content defining the heating operation that have been transmitted by the heating cooker are received, the image data and the heating control content are associated with each other, and the control information within the storage unit is updated.

Thus, merely by the user input of the heating control content being accepted and the start of the heating operation being ordered, the image data of the food and the heating control content can be stored automatically in the storage unit in association with each other. Therefore, work of registering the image data and the heating control content can be performed without particular intention by a user, and convenience for the user can be improved.

A cooking support method according to another aspect of the present invention is a cooking support method for a heating cooker that heats food, including: an image data acquisition step of acquiring image data on the food after the food has been housed in the heating chamber; an acceptance step of accepting a user input relating to heating control content defining a heating operation; a start order step of ordering start of the heating operation; a heating step of heating the food in the heating chamber; and an update step of associating the image data and the heating control content with each other and updating control information within a storage unit, when the user input is accepted in the setting acceptance step and then start of the heating operation is ordered in the start order step.

With this configuration, the image data of the food is acquired after the food has been housed in the heating chamber, the user input relating to the heating control content defining the heating operation is accepted, the start of the heating operation is ordered, and the food in the heating chamber is heated. When the user input is accepted and then the start of the heating operation is ordered, the image data and the heating control content are associated with each other, and the control information within the storage unit is updated.

Thus, merely by the user input of the heating control content being accepted and the start of the heating operation being ordered, the image data of the food and the heating control content can be stored automatically in the storage unit in association with each other. Therefore, work of registering the image data and the heating control content can be performed without particular intention by a user, and convenience for the user can be improved.

The specific embodiment or implementation in the section of the description of embodiments is merely for clarification of the technical content of the present invention. Such a specific example should not be construed narrowly as limiting and can be carried out with various changes within the spirit and the scope of claims of the present invention.

INDUSTRIAL APPLICABILITY

A heating cooker, a cooking system, an arithmetic device, and a cooking support method according to the present invention can improve the convenience for a user and are useful as a heating cooker that heats food, an arithmetic device connected to be capable of communication with a heating cooker, a cooking system including a heating cooker and an arithmetic device, and a cooking support method for a heating cooker.

What is claimed is:
1. A heating cooker comprising:
a heating chamber that houses food;
a heater that heats the food in the heating chamber;
an imaging device in a side surface of the heating chamber that acquires image data of the food after the food has been housed inside the heating chamber;
an interface that accepts a user input relating to heating control content defining a heating operation of the heating unit;
a first memory that stores control information in which the image data of the food and the heating control content corresponding to the food specified from the image data of the food are associated with each other;
a specification analyzer that specifies the heating control content associated with resembling image data resembling the image data of the food acquired by the imaging device, based on the control information stored in the first memory, where the resembling image data is acquired by superimposed histograms of first and second images of the food;
a start order button that is connected to a heating controller and starts the heating operation of the heater; and
a register that associates the image data of the food and the heating control content with each other and updates the control information within the first memory, when the interface accepts the user input and then the heating controller starts the heating operation.

2. The heating cooker according to claim 1, further comprising:
a display that presents the heating control content specified by the specification analyzer,
wherein the heating controller orders start of the heating operation defined by the heating control content presented by the display.

3. The heating cooker according to claim 2, wherein the specification analyzer determines whether or not the resembling image data is stored in the first memory to specify the heating control content associated with the resembling image data, based on the control information stored in the first memory in a case where the resembling image data is determined to be stored in the first memory, and the interface accepts the user input in a case where the specification analyzer has determined that the resembling image data is not stored in the first memory.

4. The heating cooker according to claim 2, further comprising:

a stop order button connected to the heating controller that orders stoppage of the heating operation by the heater after start of the heating operation defined by the heating control content presented by the display has been ordered by the heating controller, wherein the register deletes from the first memory the heating control content presented by the display and the image data of the food associated with the heating control content in a case where stoppage of the heating operation has been ordered by the heating controller.

5. The heating cooker according to claim 2, further comprising an image calculator that calculates average image data in which the image data of the food acquired by the imaging device and the resembling image data stored in the first memory are averaged and that stores the average image data in the first memory in association with the heating control content, after start of the heating operation defined by the heating control content presented by the display has been ordered by the heating controller.

6. The heating cooker according to claim 1, further comprising:
   a second memory that stores the heating control content and a plurality of types of image data of the food associated with the heating control content; and
   an extraction comparator that extracts a plurality of types of the resembling image data that resemble each other from the plurality of types of image data of the food,
   wherein the register registers the heating control content and the plurality of types of the resembling image data in the first memory after associating the heating control content and the plurality of types of the resembling image data with each other in a case where an acquisition frequency of the plurality of types of the resembling image data exceeds a predetermined value.

7. The heating cooker according to claim 6, wherein the register calculates a count value representing the number of the extracted plurality of types of the resembling image data and, in a case where the count value exceeds a predetermined value, registers the heating control content and the plurality of types of the resembling image data in the first memory after associating the heating control content and the plurality of types of the resembling image data with each other.

8. The heating cooker according to claim 1, further comprising:
   a calculator that calculates a feature quantity of the image data of the food acquired by the imaging device,
   wherein the register associates the feature quantity calculated by the calculator and the heating control content with each other and updates the control information within the first memory.

9. A cooking system comprising:
a heating cooker that heats food; and
an arithmetic device connected to the heating cooker to communicate therewith, arithmetic device including a receiver, the heating cooker including
a heating chamber that houses food,
a heater that heats the food in the heating chamber,
an imaging device in a side surface of the heating chamber that acquires image data of the food after the food has been housed inside the heating chamber,
an interface that accepts a user input relating to heating control content defining a heating operation of the heater,
a start button that is connected to a heating controller and starts the heating operation to the heater, and
a transmitter that transmits the image data of the food and the heating control content to the arithmetic device, when the interface accepts the user input and then the heating controller starts the heating operation, and the receiver receives the image data of the food and the heating control content,
a memory that stores control information in which the image data of the food and the heating control content corresponding to the food specified from the image data of the food are associated with each other,
a specification analyzer that specifies the heating control content associated with resembling image data resembling the image data of the food acquired by the imaging device, based on the control information stored in the first memory, and
a register that associates the image data and the heating control content with each other and updates the control information within the memory.

10. An arithmetic device connected to a heating cooker that heats food, the arithmetic device comprising:
a receiver that receives image data of the food acquired by an imaging device in a side surface of a heating chamber after the food has been housed in the heating chamber and heating control content defining a heating operation that have been transmitted by the heating cooker;
a memory that stores control information in which the image data of the food and the heating control content corresponding to the food specified from the image data of the food are associated with each other;
a specification analyzer that specifies the heating control content associated with resembling image data resembling the image data acquired by the imaging device, based on the control information stored in the memory; and
a register that associates the image data of the food and the heating control content with each other and updates the control information within the memory.

* * * * *